(12) United States Patent
Mathews

(10) Patent No.: US 11,099,854 B1
(45) Date of Patent: Aug. 24, 2021

(54) PIPELINED OPERATIONS IN NEURAL NETWORKS

(71) Applicant: Mark Ashley Mathews, Fairfield, CA (US)

(72) Inventor: Mark Ashley Mathews, Fairfield, CA (US)

(73) Assignee: Gigantor Technologies Inc., Melbourne Beach, FL (US)

( * ) Notice: Subject to any disclaimer, the term of this patent is extended or adjusted under 35 U.S.C. 154(b) by 0 days.

(21) Appl. No.: 17/231,711

(22) Filed: Apr. 15, 2021

Related U.S. Application Data

(63) Continuation-in-part of application No. 17/071,875, filed on Oct. 15, 2020.

(51) Int. Cl.
*G06F 9/30* (2018.01)
*G06F 9/38* (2018.01)

(52) U.S. Cl.
CPC .......... *G06F 9/3893* (2013.01); *G06F 9/3836* (2013.01); *G06F 9/3869* (2013.01)

(58) Field of Classification Search
None
See application file for complete search history.

(56) References Cited

U.S. PATENT DOCUMENTS

| | | | |
|---|---|---|---|
| 10,860,922 B2* | 12/2020 | Dally | G06F 7/5443 |
| 2016/0328645 A1* | 11/2016 | Lin | G06N 3/063 |
| 2019/0212981 A1* | 7/2019 | Park | G06N 3/04 |
| 2019/0332903 A1* | 10/2019 | Nealis | G06F 5/015 |

* cited by examiner

*Primary Examiner* — Corey S Faherty
(74) *Attorney, Agent, or Firm* — Donald R. Boys; Central Coast Patent Agency LLC

(57) ABSTRACT

An integrated circuit (IC) implements an M by N aperture function over an R by C source array. The IC has an input port receiving an ordered stream of independent input values, an output port producing an output stream, a mass multiplier circuit multiplying inputs by weights, producing streams of products on pathways on the IC, an M by N array of compositor circuits on the IC, single dedicated pathways between compositors, delay circuits, a finalization circuit, and a control circuit operating counters and producing control signals. The compositors combine the values received from product pathways, further combine that result to an initial value or to a value from an adjacent compositor upstream, or to a value from a delay circuit. Upon a last downstream compositor producing a complete composition of values, that value is passed to the finalization circuit, which posts a result to the output port.

12 Claims, 26 Drawing Sheets

PIPELINED OPERATIONS IN NEURAL NETWORKS

CROSS-REFERENCE TO RELATED APPLICATIONS

The instant application is a continuation-in-part of co-pending application Ser. No. 17/071,875 filed Oct. 15, 2020. All disclosure of the parent application is incorporated at least by reference.

BACKGROUND OF THE INVENTION

1. Field of the Invention

The present invention is in the technical area of computer operations involving matrix inputs and outputs and pertains more specifically to circuits designed for mass multiplication in matrix operations.

2. Description of Related Art

Use of computers in matrix operations is well-known in the art, specific examples being image processing and development and use of neural networks. Neural networks are part and parcel of artificial intelligence, and as such are, at the time of filing the instant patent application, a very popular subject in development of intellectual property. Generally speaking, in computer operations of this sort, substantial numbers of input values are processed in a regular pattern, the pattern being in most instances a matrix. Processing of input values may involve biasing and applying weights by which individual input values may be multiplied.

The present inventor believes that the sophisticated and computationally intense operations in the technology of neural networks wherein incoming values are multiplied by each of a plurality of weight values, is a step open to innovation to provide distinct advantages in the technology. The inventor also believes that there are advantages to be gained in revising the order of mathematical processes to be applied.

The present inventor believes that he has determined a general change in the order and manner of mathematical processes to be implemented in such applications that may well produce a very significant reduction in time and cost in such operations.

BRIEF SUMMARY OF THE INVENTION

In one embodiment of the invention an integrated circuit (IC) implementing an M by N aperture function over an R by C source array to produce an R by C destination array is provided, the IC comprising an input port receiving an ordered stream of independent input values from the source array, an output port producing an ordered output stream of output values into the destination array, a mass multiplier circuit coupled to the input port, multiplying in parallel each input value in order by every weight required by the aperture function, producing streams of products on a set of parallel conductive product pathways on the IC, each product pathway dedicated to a single product of an input by a weight value, an M by N array of compositor circuits on the IC, each compositor circuit associated with a sub-function of the aperture function at the (m, n) position, and coupled by a dedicated pathway to each of the set of product pathways carrying a product produced from a weight value associated with the sub-function, single dedicated pathways between compositors, delay circuits on the IC receiving values on dedicated pathways from compositors and providing the values delayed at later times on dedicated pathways to other compositors downstream, a finalization circuit, and a control circuit operating counters and producing control signals coupled to the compositors, the delay circuits, and the finalization circuit. In each source interval the compositors combine the values received from the dedicated connections to the parallel conductive pathways, further combine that result to an initial value for that compositor or to a value on the dedicated pathway from an adjacent compositor upstream, or to a value received from a delay circuit, and post that combined result to a register coupled to the dedicated pathway to the adjacent compositor downstream, or to a delay circuit, or both, and, upon a last downstream compositor producing a complete composition of values for an output of the aperture function at a specific position of the R by C array of inputs, that composed value is passed to the finalization circuit, which processes the value and posts the result to the output port as one value of the output stream.

In one embodiment the aperture function is for a Convolutional Neural Node, wherein in each source interval the compositors add the products of the weights with inputs and add that sum of the products to an initial bias or to a value on the dedicated pathway from an adjacent compositor upstream, or to a value received from a delay circuit, and post that summation to an output register. Also, in one embodiment the aperture function produces truncated results for positions of the aperture that overlap the M by N input patches with the left and right edges of the R by C input array, wherein for specific source intervals wherein the source input position represents the first or last columns of the R by C input array, results of truncated patches are delayed, accessed by the compositors and integrated with the flow of complete interior patches. And in in one embodiment the aperture function produces truncated results for those specific positions that overlap the M by N input patches with the topmost edge of the R by C input array, wherein for specific source intervals where the source input position represents the first row of the R by C input array, results of truncated patches are delayed, accessed by the compositors and integrated with the flow of complete interior patches.

In one embodiment the aperture function produces truncated results for those specific positions that overlap the M by N input patches with the bottom edge of the R by C input array, wherein for specific source intervals where the source input position represents the first row of the R by C input array, results of truncated patches are delayed and integrated with the flow of complete interior patches. And in one embodiment of the IC specific outputs of the aperture function are omitted from the output stream in a fixed or variable stepping pattern.

In another aspect of the invention a method implementing an M by N aperture function over an R by C source array is provided, producing an R by C destination array, comprising steps of providing an ordered stream of independent input values from the source array to an input port of an integrated circuit (IC), multiplying in parallel each input value in order by every weight value required by the aperture function by a mass multiplier circuit on the IC coupled to the input port, producing by the mass multiplier streams of products on a set of parallel conductive product pathways on the IC, each product pathway dedicated to a single product of an input by a weight value, providing to each of an M by N array of compositor circuits on the IC, each compositor circuit associated with a sub-function of the aperture function, by dedicated connections to each compositor circuit from the streams of products, those products produced from a weight value associated with the sub-function, providing control signals to the compositors, to a plurality of delay circuits and to a finalization circuit by a control circuit executing counters and producing control signals, combining by the compositors, in each source cycle, the values received from the dedicated connections to the streams of products, with an initial value for that compositor or to a value on a dedicated pathway to an adjacent compositor upstream, or to a value received from one of a plurality of delay circuits, and posting the result in a register coupled to a dedicated pathway to an adjacent compositor downstream, or to one of the plurality of delay circuits. Upon a last downstream compositor producing a complete combination of values for an output of the aperture function at a specific position on the R by C array of inputs, providing that complete combination to a finalization circuit, processing the complete combination by the finalization circuit and posting the result to an output port as one value in an ordered output stream, and continuing operation of the IC until all input elements have been received and a last output value has been produced to the output stream.

In one embodiment of the method the aperture function is for a Convolutional Neural Node, wherein, in each source interval the compositors add the products of the weights with inputs and add that sum of the products to an initial bias or to a value on the dedicated pathway from an adjacent compositor upstream, or to a value received from a delay circuit, and post that summation to an output register. Also, in one embodiment the aperture function produces truncated results for positions of the aperture that overlap the M by N input patches with the left and right edges of the R by C input array, wherein for specific source intervals wherein the source input position represents the first or last columns of the R by C input array, results of truncated patches are delayed, accessed by the compositors and integrated with the flow of complete interior patches.

In one embodiment of the method the aperture function produces truncated results for specific positions that overlap the M by N input patches with the topmost edge of the R by C input array, wherein for specific source intervals where the source input position represents the first row of the R by C input array, results of truncated patches are delayed, accessed by the compositors and integrated with the flow of complete interior patches.

In one embodiment the aperture function produces truncated results for those specific positions that overlap the M by N input patches with the bottom edge of the R by C input array, wherein for specific source intervals where the source input position represents the first row of the R by C input array, results of truncated patches are delayed and integrated with the flow of complete interior patches. And in one embodiment specific outputs of the aperture function are omitted from the output stream in a fixed or variable stepping pattern.

DETAILED DESCRIPTION OF THE INVENTION

Figure 1:
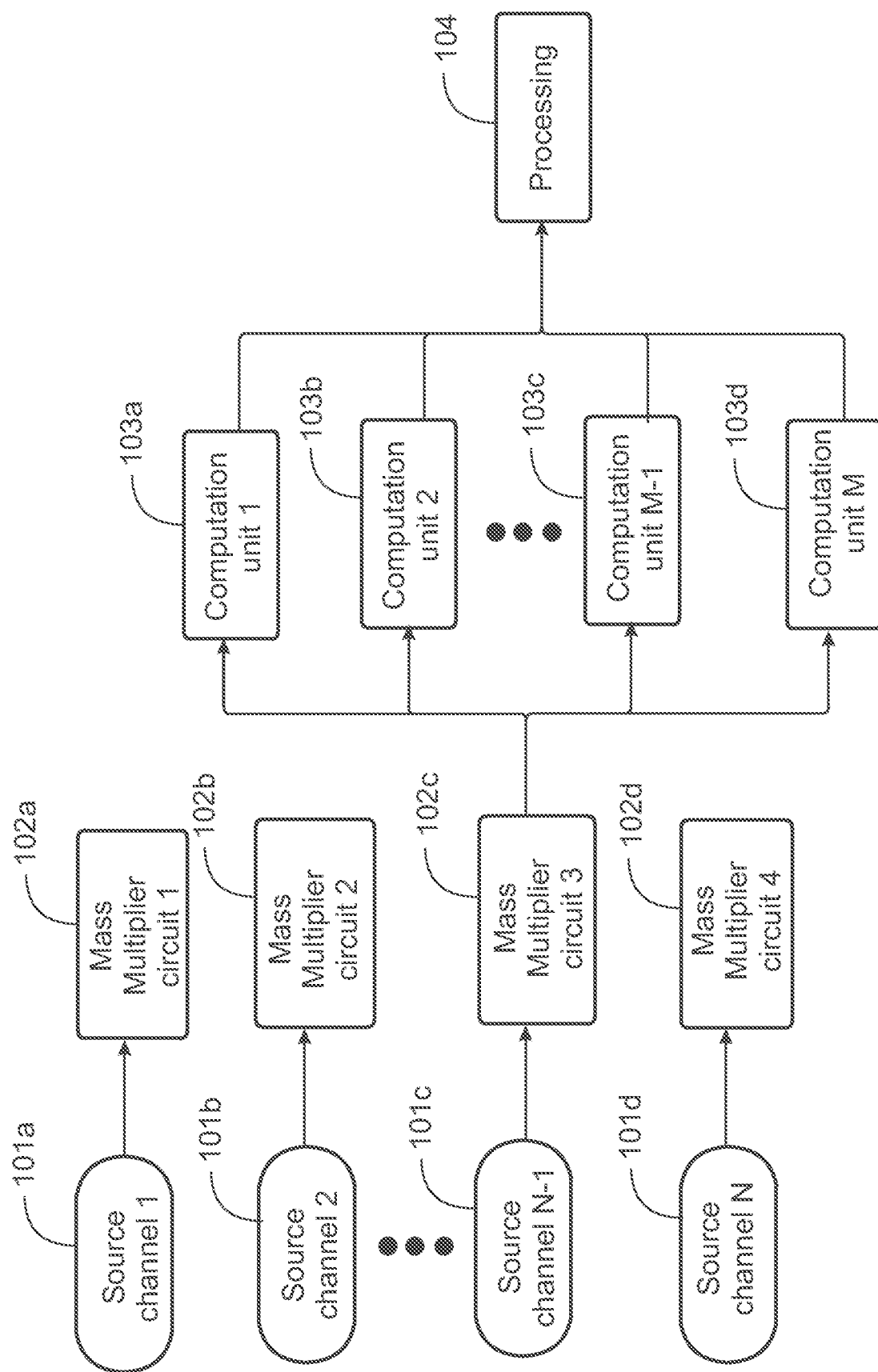
FIG. 1 illustrates an embodiment where mass multipliers applied to each common source are fixed and wired directly into a processing circuit.

A wide variety of image and data algorithms make extensive use of matrix forms of linear algebra both to prove propositions and to calculate results. In the instant application by "an algorithm" is meant a process or set of rules to be followed in calculations or other problem-solving operations, especially by a computer. Algorithms are not to be universally construed as software in this application. Algorithms as described in the instant application may, and typically are preferably, implemented in hardware.

Matrix operations are defined as orthogonal collections of one or more dimensions and are generally conceived as having the same number of elements in every iteration of each given dimension. By way of example, an M by N matrix is frequently depicted by an array of values such as:

$$A = \begin{bmatrix} a_{1,1} & a_{1,2} & \cdots & a_{1,N-1} & a_{1,N} \\ a_{1,1} & a_{1,2} & \cdots & a_{1,N-1} & a_{1,N} \\ \vdots & \vdots & & \vdots & \vdots \\ a_{M-1,1} & a_{M-1,2} & \cdots & a_{M-1,N-1} & a_{M-1,N} \\ a_{M,1} & a_{M,2} & \cdots & a_{M,N-1} & a_{M,N} \end{bmatrix}$$

Conceptually, a matrix may have any number of dimensions and the matrices may be depicted as sets of tables showing the values for each dimension.

The subset of matrices of the forms M by 1 or 1 by N may be referred to as vectors which have their own specific properties and operations defined and are used extensively in 2D and 3D graphic simulations.

A degenerate subset of matrices of the form 1 by 1 may be referred to as scalars and constitute numbers quite familiar to the skilled person.

When the values of a matrix are constants, and the matrices are of compatible dimensions, certain operations such as multiplication are well defined. A 3 by 4 matrix A can be multiplied by a 4 by 5 matrix B to form a 3 by 5 matrix C which may often be written as:

$$A \times B = C$$

$$c_{i,j} = \sum_{k=1}^{4} a_{i,k} b_{k,j}$$

However, the operation B×A is not well defined because the inner dimensions do not match (5≠3), and k would not have a single range that is compatible with the indices of B and A.

A matrix whose elements are vectors or other matrices is known as a tensor (from which the name of TensorFlow is derived). A familiar form of a tensor may be an RGB image. One form of an RGB image is an HDMI frame as a 1080 by 1920 matrix of RGB values each pixel of which is a 3 by 1 vector of color components. A pixel is considered a true vector because no linear operation of the Red component affects Green or Blue and vice versa.

An HDMI frame is not generally considered a five-dimensional matrix because the treatment of positions of pixels in the image is not related to treatment of the colors. It is valid and quite meaningful to crop an image by discarding parts of the image that are not of interest but there is no corresponding operation to crop color components. Likewise, there may be many operations on the colors with easily comprehensible effects that would be meaningless if applied to the elements of the containing array. So the HDMI frame is clearly a 2,3 tensor and not a 5D array.

There are many image processing algorithms known that may be expressed as matrix operations. A matrix operation is a succinct way of expressing repetitive operations and the rules of matrix mathematics are instrumental in proving specific propositions.

Execution of matrix-based algorithms on general purpose computer processors is generally accomplished by looping mechanisms, and both computer languages and hardware CPUs may have features to make such loops efficient. However, there is nothing inherent in the mathematics of matrix definitions that requires that operations be executed by any specific method or plan in order to compute correct results.

A modern hybrid of image processing and cognition is a convolutional neural network (CNN). While training such networks has been quite challenging for years, actually executing trained networks is relatively trivial.

In CNNs each convolutional output element operates by passing an independent kernel over an input tensor to produce each component of an output tensor. Typically, when a neural network is used to process images, the first layer of the network operates on an input array of the RGB pixels of the image and produces an output array of related size containing an arbitrary vector of output components that is structurally unrelated to the RGB vector of input components. The output vector components are generally described as features or activations and represent the response strength (degree of recognition) of each kernel. Subsequent layers in the CNN take output from preceding layers as their input, so only the very first layer acts on the pixel values; all the rest act on features to produce more features. Each output feature of the convolution is unrelated and distinct from every other feature just as the color components are distinct from one another.

A common form of a CNN layer is a 3 by 3 Convolution. In operation a 3 by 3 kernel of constant weights is applied to each specific position of the input tensor (i.e. image) element wise; that is, each of the weights is multiplied by the pixel components at the same relative position in the image and the products are summed to produce a single component of the output for that position. A bias constant (which may be zero) provides the initial value to facilitate solving the model to arrive at optimal weight values.

If there are three input components, as there are in an RGB image, then there are three distinct sets of 3 by 3 weights to be applied to each component value (in the case of the first layer, the colors) but only a single initial bias. Each convolution of the 3 by 3 by 3 weights plus bias forms a single output component value corresponding to the position at the center of a 3×3 patch of pixels. Each output channel applies its own 27 weight values in turn, until all output components for a given patch (the subset of input components at the same position as the output position and corresponding to the relative positions of the kernel weights) have been computed. It is common for a convolution to have between 64 and 256 output components, each of which has a unique specific set of 27 weights plus a bias.

In this example each kernel is multiplying its 27 weights against the same patch of 9 pixels of 3 RGB components. For a relatively small set of 64 output components, each individual input component is multiplied by 64 arbitrary and unrelated weights. After the output components for each patch are computed, an adjacent patch is loaded from the image and the full set of weights of the kernel is applied again. This process continues until the right edge of the image is reached, and then the patch drops down one row and starts over from the left edge.

After the first layer is processed, the next convolution layer processes the output of the first as input to the second layer. So, a 3 by 3 convolution now has 3 by 3 by 64 weights to be applied to the 3 by 3 by 64 input components of the patch. If this layer has 256 outputs, 3×3×64×256=147,456 multiplications must be performed for each output position. The skilled person will understand that this refers to a single layer in a Deep Neural Network that may contain more than 40 layers.

The number of multiplications applied to each element of a patch is equal to the number of channels in the layer. In a standard CPU, these must necessarily be done in some sequence. Many modern CPUs have a capability of executing sets of multiplies simultaneously, especially if the data format is small (i.e. 8 bits). In a GPU or TPU, the number of multipliers available is much higher but each multiplier is designed to produce a product from two distinct and unrestricted factors.

In the current art processors, CPUs, TPUs or GPUs, do not take advantage of the simple fact that in CNN implementations one of the factors for multiplication is common for all the weights applied to an input channel during the processing for a patch.

The inventor in this application proposes a mass multiplier that performs all multiplications, otherwise conventionally done sequentially, in a single step. When the weights of a set of multiplications are all of some small precision (8 bits is typical for a TPU), there are a limited ($2^8$=256) number of distinct weights, and a corresponding number of distinct multiples of the common input (which may be of any size; no matter what precision the common factor is, there are still only 256 possible multiples when 8 bit weights are applied.) In this case there is a distinct advantage to implementing a circuit that produces all the required outputs at once with many fewer elements than the same number of unrestricted multipliers.

In an embodiment of the invention an equivalent mass multiplier is dedicated to a single input channel and is not always shared. So, the operation has an option of using several clock cycles and multiple register stages. This allows the operation to take very simple and efficient forms without impacting overall throughput of the system.

In common cases where a single dynamic value is multiplied by many constants, substituting a single multi-stage mass multiplier circuit, as in an embodiment of the present invention, for the equivalent set of independent single stage multiplier circuits results in a system that performs the same calculations with substantially higher throughput and substantially lower power and footprint. Even if the set of outputs is less than the number of actual multiples used, there may still be considerable savings in power and space.

Having established a distinct advantage of a unique mass multiplier in an embodiment of this invention over independent multipliers, reordering the sequence of operations can increase the advantage further.

There is nothing in the mathematics of a neural network (or other similar image processing) algorithm that requires any specific sequence of operations. If the same operations are done in any order, the same correct computation will be made. The inventor observes that the usual order for software executing on a CPU, GPU, or TPU-based design is to produce all output channels for a given position at the same time by multiplying the weights by the inputs and summing them immediately. Producing all output channels for a given position at the same time by multiplying the weights by the inputs and summing them immediately minimizes the number of times the inputs must be read from RAM as well as limiting the number of times the weights must be read, also from RAM. It does not eliminate reading the inputs multiple times because there is no place to retain them when processing the next row down other than RAM.

However, if, in an embodiment of this invention, the order of operations of a kernel or other aperture function defined to operate on an M by N patch of array inputs, is everted, that is, effectively turned inside out, then each input value is utilized only once, and no RAM buffers are required. Instead of producing outputs one at a time by reading the inputs redundantly as the aperture function passes over each row, this unique operation processes the inputs one at a time only when initially presented and retains partial sums for all incomplete outputs. The partial sums may be retained in hardware shift registers or standard hardware first-in first-out registers (FIFOs), and the number of registers required to hold the values retained is proportional to the height of the kernel and the width of the input rows.

As the function that implements an aperture function can be decomposed into a series of sub-functions, each of which operates on the result of the immediately prior sub-function, the implementation of the kernel may be accomplished by composing the sub-functions in sequence over time such that each operates on the data immediately as received and results in the identical sequence of operations as applying the kernel in the abstract. We refer to this recomposed function, including any initialization, as an aperture function, and the individual steps as sub-functions. An aperture function, as used herein, refers to any M by N calculation to be implemented at a plurality of positions on a sliding window, or patch, of M by N inputs of a larger R by C array of inputs. An aperture function, as with implementation of a full CNN kernel, may also include an initialization and finalization operation. In the case of a CNN the initialization preloads a bias value into the accumulators and the finalization transforms the raw output of the kernel via an arbitrary activation function.

In this example of this invention, as components of each new input position are presented, the components at that position represent the first element of the patch down and to the right, and simultaneously the last element of the patch up and to the left and intermediate elements of all other patches that intersect the current position. This allows a computational circuit to be developed as an embodiment of this invention that has a fixed number of elements in process at all times (with some possible exceptions near the edges of the input) and produces outputs at the same rate as it accepts inputs.

Where the guiding algorithm requires evaluation of the aperture function over a patch that extends past an edge of the input array, many special cases and issues arise, but they are not insurmountable. Special case logic may be added such that the overlapping patch's partial results are made compatible with the normal case without affecting overall throughput.

In embodiments of the invention this everted form of aperture function operations accepts inputs as a stream and produces outputs as a stream. Inputs need not be buffered in RAM because they are each referenced only once. Since the outputs are also in a stream, they also can be processed by subsequent layers without RAM buffering, which is a result attributable to this invention that substantially increases processing speed over many otherwise necessary read and write operations to RAM.

In an embodiment of the invention, in place of many layers sharing a single set of independent multipliers executing, storing and then reading back the results to process the next layer in sequence, a pipeline may be produced using dedicated mass multipliers that processes all layers simultaneously, feeding the output stream of each layer into the input of the next layer without waiting for any layers to be complete.

A fully implemented pipeline in an embodiment of the invention thus may reach an effective throughput measured at two orders of magnitude greater than a conventional output-centric ordering process and eliminates contention for RAM (because it doesn't use RAM). It is this contention for RAM that forms a primary bottleneck for GPU and TPU-based processing.

Latency of such a system in an embodiment of this invention is reduced to the time from input of last pixel to output of last result. Since the last pixel of the image, by definition of the algorithms, must necessarily be the last datum required to complete all of the final computations for all layers, the latency of the system is strictly the clocking rate times the number of distinct clock stages in the pipeline including the final output.

Using a single dedicated mass multiplier for each input channel throughout a neural network in an embodiment of this invention (in place of a limited set of independent multipliers that must be reused and dynamically assigned) makes it possible to build a pixel-synchronous pipeline where all multiplications are executed in parallel because it only takes a single mass multiplier to process an arbitrary number of weights applied.

Having described the essential features of the innovation of mass multipliers, and also advantages of eversion, the inventor posits specific examples below:

FIG. 1 is a diagram illustrating an embodiment of the invention wherein each of a plurality of one or more source channels 1 through N, labeled 101a through 101d has a dedicated mass multiplier 102a through 102d assigned. Since each source channel in this example has a dedicated mass multiplier circuit to create the set of multiples of that channel's values, the source channel formats may vary between signed, unsigned, fixed or floating point in any precision convenient for the processing algorithm implemented in hardware. Specific outputs of each mass multiplier circuit, such as mass multiplier circuit 102c, may be fed directly into one or more computation units 103a through 103d that may perform calculations that require multiples of any or all of the source channels. Such computation units may be used to implement independent output channels of a single algorithm or unrelated algorithms to be computed on the same source channels. The outputs of the computations may be forwarded for further processing as shown at 104 as may be required by the algorithm, or algorithms, implemented in hardware. This situation arises, for example, when implementing a Neural Network in a Field Programmable Gate Array (FPGA) where the weight values applied as multiplicands will not change.

Figure 2:
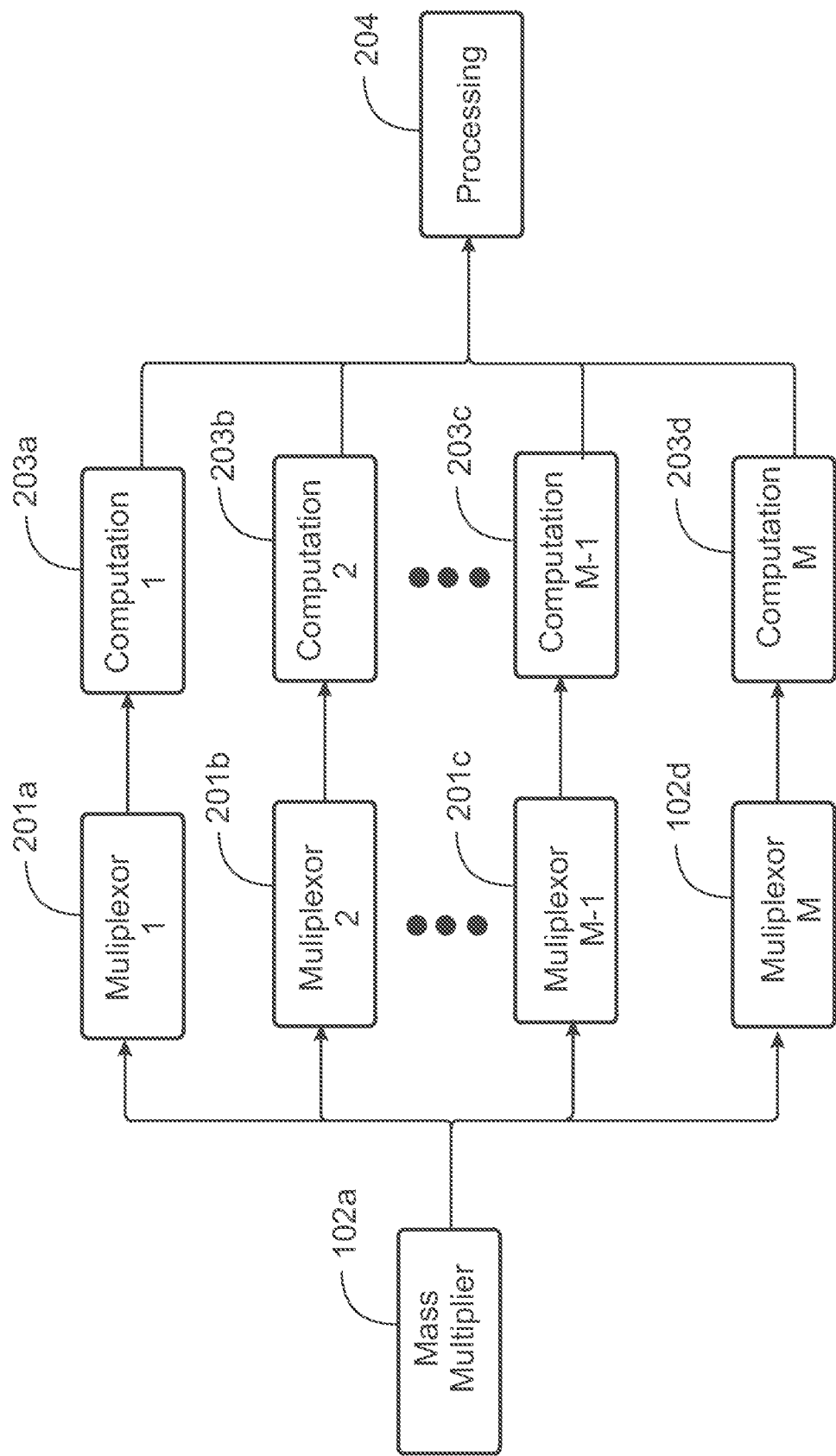
FIG. 2 illustrates an embodiment where the mass multipliers applied to each common source are dynamic and routed through multiplexors to the processing circuit.

FIG. 2 illustrates an embodiment of the invention wherein the outputs of each mass multiplier, such as mass multiplier 102a of FIG. 1, are fed through a set of multiplexors 201a through 201d into computation units 203a through 203d such that the multiple selected may be chosen either on initialization of the system, or dynamically as it operates.

The outputs of the computations may then be forwarded for further processing at 204 as before. This situation arises when implementing a Neural Network in an application specific integrated circuit (ASIC) where the structure of the computation is committed but the weight values used need to be alterable.

Figure 3:
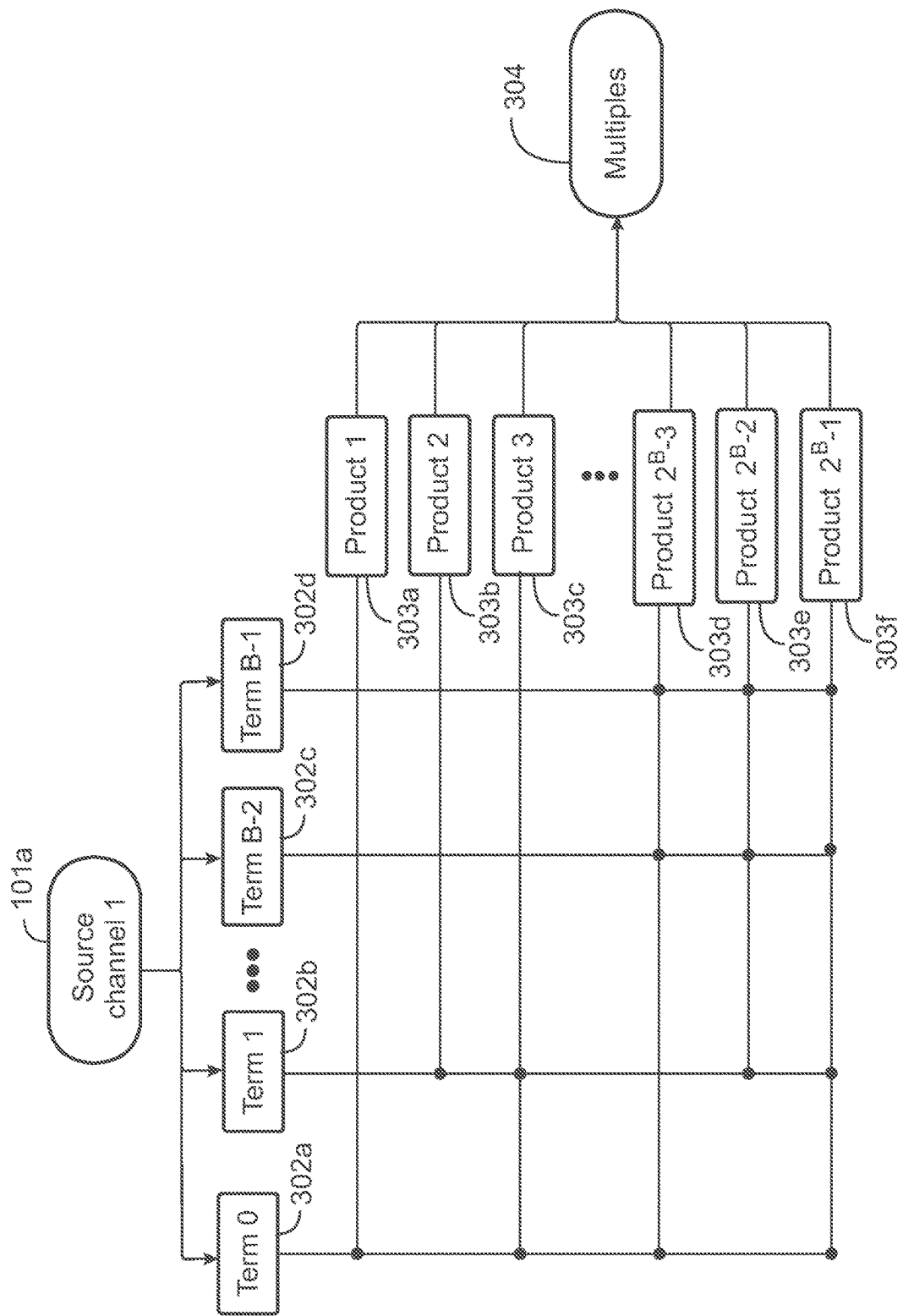
FIG. 3 illustrates a simple embodiment where shifted terms corresponding to bits set in each mass multiplier are summed to form a product.

FIG. 3 illustrates internal structure of mass multiplier 102a of FIG. 1 and FIG. 2 in one embodiment. This structure may be common to mass multipliers 102b, 102c, and 102d, as well as to other mass multipliers in other embodiments of the invention. In this structure products 303a through 303f of source channel multiplicand 101a of A bits by all possible multipliers of B bits are produced in parallel and delivered to multiples 304. In this example the A bits of source multiplicand 101a are duplicated and shifted up by appending 0 bits to the least significant position and padded by prepending 0 bits to the most significant position such that a full set of all required shifted values from 0 to B−1 are available in form of a vector of A+B bit terms 302a through 302d. These terms may be formed simply by routing circuit connections and no register or logic circuitry is required. In a case where the clock period is sufficient to allow a maximum of B terms of A+B bits to be composed in a single period, no registers or sub-composition may be required. Individual products 303a through 303f of the summed terms may be registered locally or forwarded for further processing as combinatorial logic. Each product of 1 to 2^B−1 times a source multiplicand 101a may be formed by adding any or all of the B corresponding terms 302a through 302d wherever a 1 bit in each multiplier occurs. The multiple 0 of any and all sources is a constant of all 0 bits and may be included in multiples 304 for completeness when using multiplexors but otherwise requires no circuitry. Any unused products 303a through 303f may be omitted either by leaving them out of the circuit specifications, allowing the synthesis tools to delete them, or by any other method. Unused terms 302a through 302d may also be omitted but as they do not occupy logic this is generally without effect. In this fashion, all required multiples 304 of a source multiplicand 101 may be formed as a single stage pipeline or as combinatorial logic.

Figure 4:
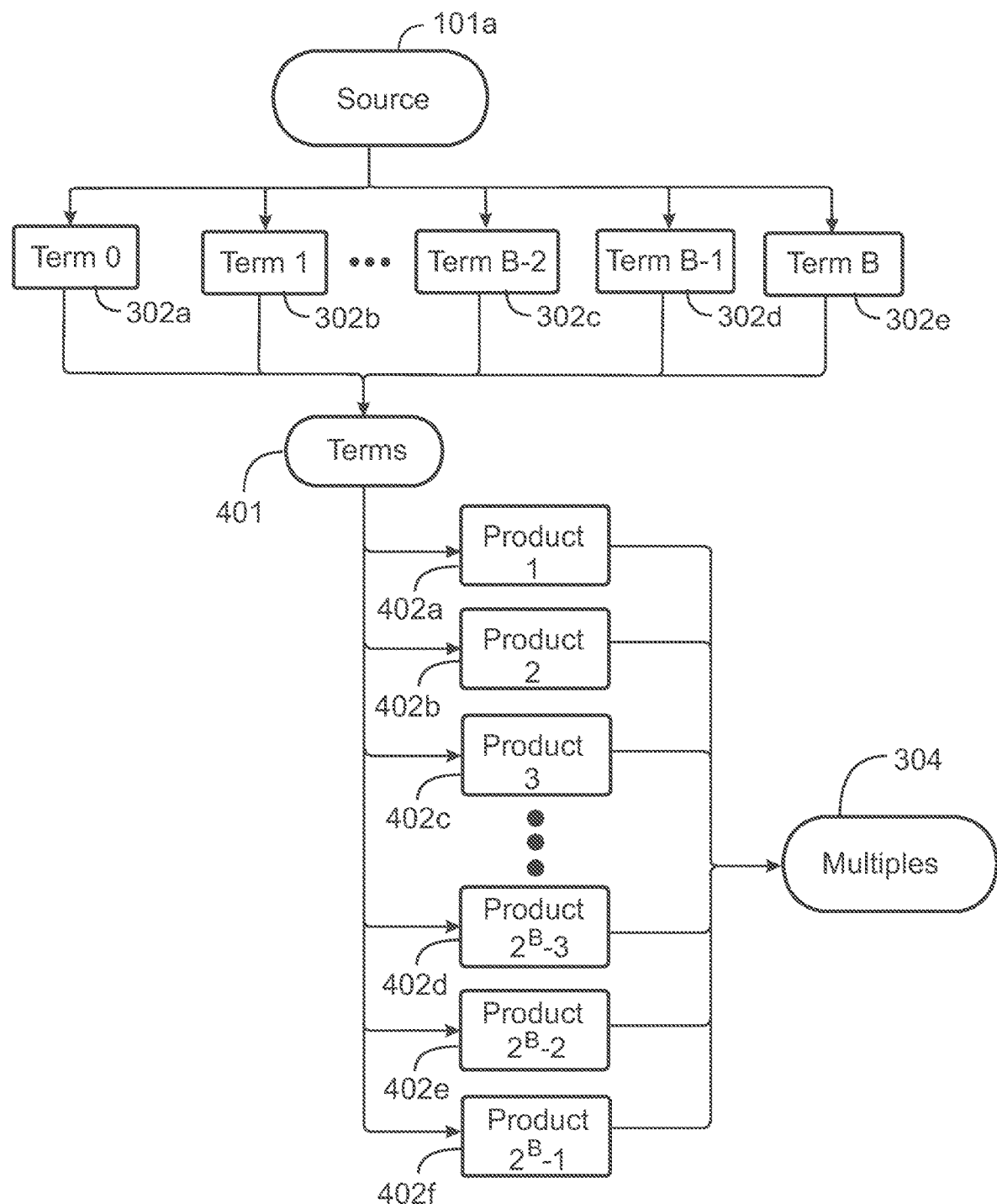
FIG. 4 illustrates an enhanced embodiment where addition and subtraction of shifted terms from each other are mixed to form an equivalent solution of lower complexity.

FIG. 4 shows an optimized embodiment wherein a set of terms 401 is comprised of all required individual terms 302a through 302e from 0 to B inclusive formed of A+B+1 bits. This allows for products 402a through 402f to include subtraction from a larger term in lieu of addition of smaller terms and may be used to reduce the overall size of a circuit which may also increase maximum allowed clock frequency. For example, for any given input a and multiplier 15, 8a+4a+2a+1a=15a combines four components while 16a−1a=15a combines only two and may be generally expected to be more compact and efficient. Each product 402a through 402f may be composed of any additions and subtractions of terms 302a through 302e that yield the correct result, and each specific variant may be chosen based on optimal tradeoffs for the specific implementation technology. For example, a subtraction of two N bit quantities may require more logic than an addition of two N bit quantities, but in general an addition of three N bit quantities will always require more logic than a subtraction of two. The treatment of required multiples 304 is unaltered by details of composing individual products 402a through 402f.

Figure 5A:
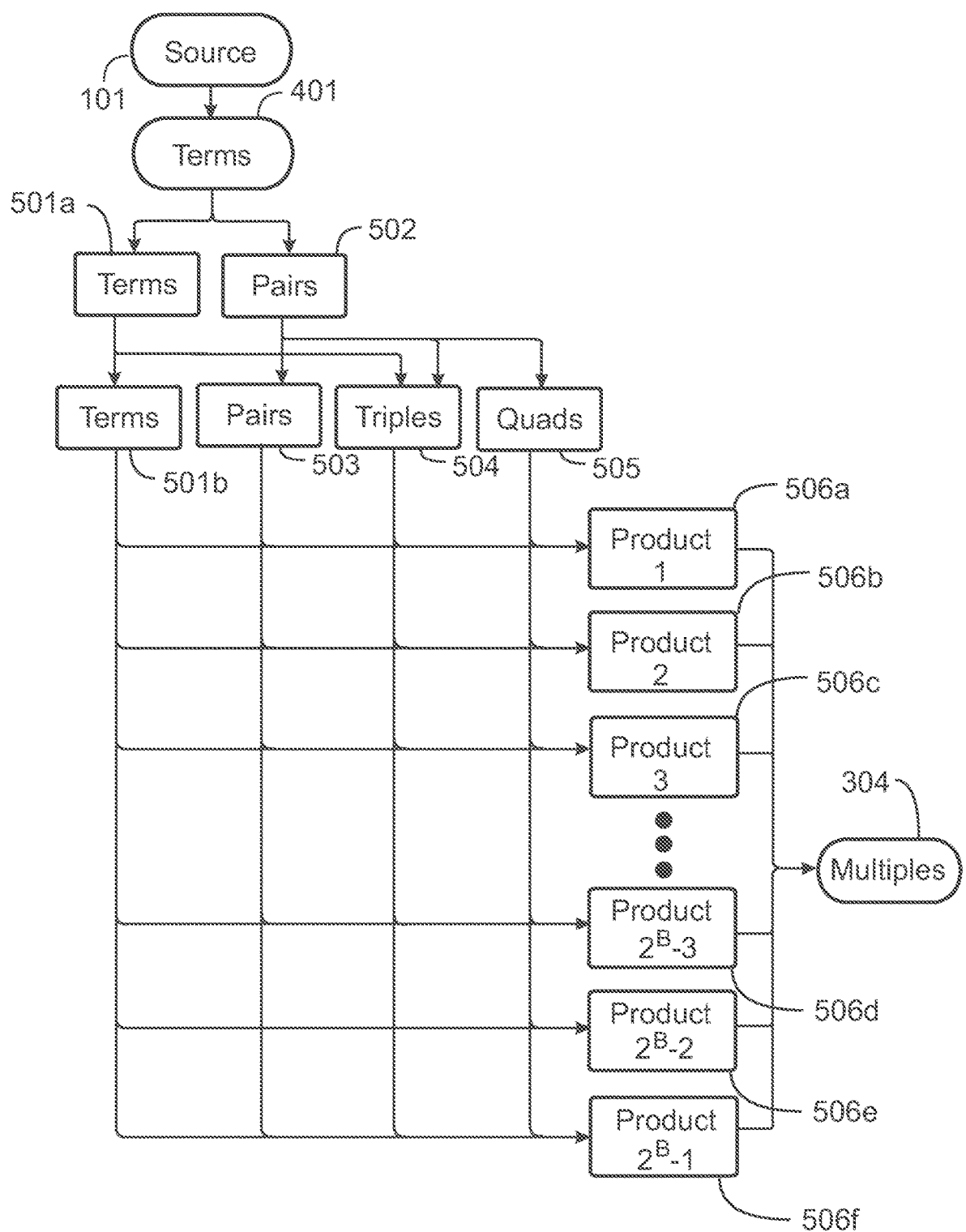
FIG. 5A illustrates a pipelined embodiment that maximizes clock frequency by building sub-compositions from only pairwise operations.

FIG. 5A illustrates an embodiment of a mass multiplier wherein the clock period is such that only a single addition of A+B bit values (or A+B+1 if subtractions are used) is possible per period. In this case, in order to accommodate multiples where more than two terms are utilized, it is necessary to arrange required elements into a multi-stage pipeline. Terms 401 are formed from each source channel 101 as before but are retained one or more times in pipeline registers 501a and 501b for later reference. Pairs 502 of two terms summed are computed and registered and then preserved 503 as necessary. Triples 504 are formed as sums of pairs 502 and retained terms 501. Quads 505 of term values are formed as sums of pairs 502. Any and all unused elements may be omitted and to increase overlap only descending sequences of addends may be specified. This ensures that redundant sums, e.g. a+b and b+a, are not both utilized and retained in the final circuit. Products 506a through 506f may utilize any addition or subtraction operation of any pair of registered sub-compositions that meet timing constraints. By consistently using the largest element available total size and hence power may be reduced but any combination of operations that yield correct results are acceptable.

The embodiment of FIG. 5A is sufficient to produce all required multiples where B=8. For larger multiple sets, sub-compositions shown may be recombined in further pipeline stages such that all required multiples 506a through 506f for any value of B may be composed from single clock operations on the extended set of sub-compositions that includes the previously disclosed retained terms 501b, retained pairs 503, triples 504, and quads 505 together with such other sub-compositions as required to form a set of terms sufficient to form the multiples 506a through 506f by single clock operations.

Figure 5B:
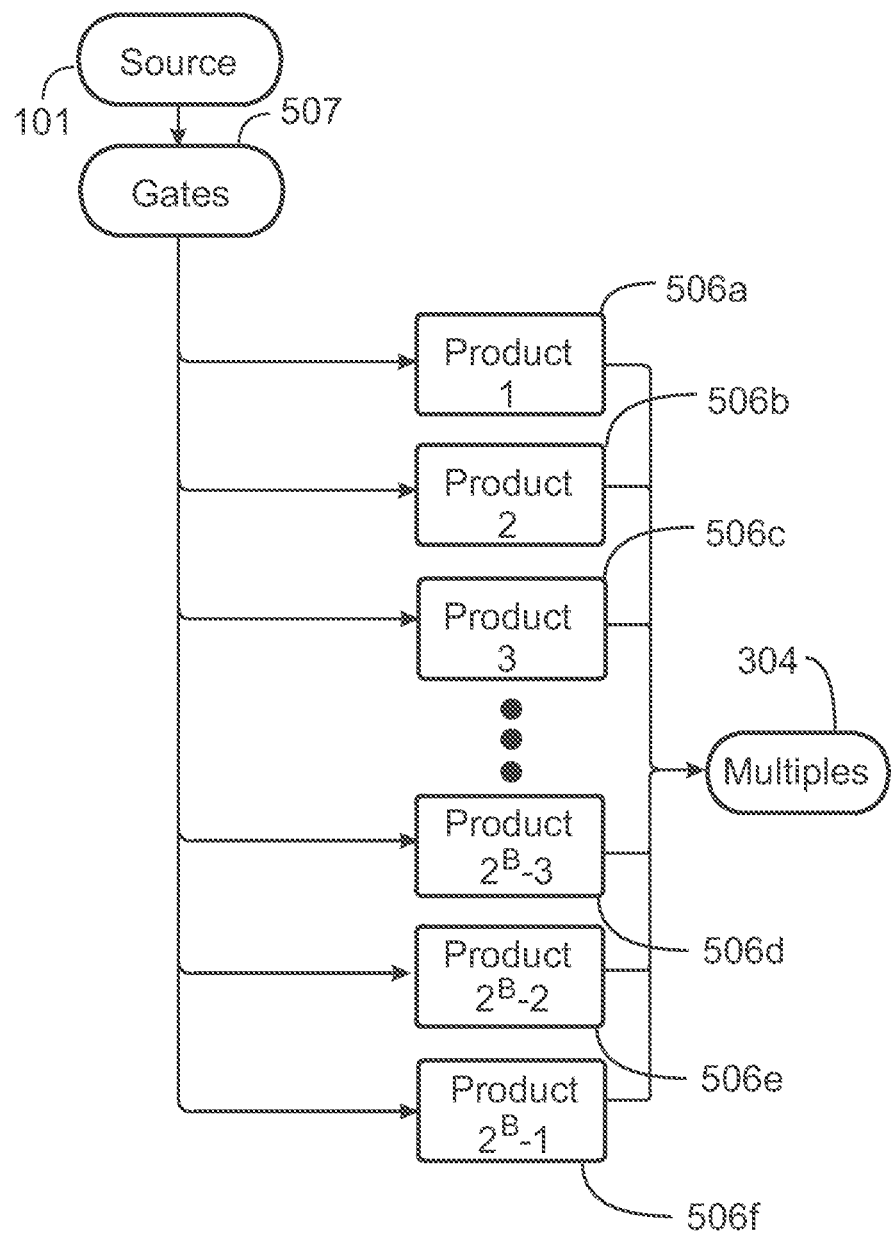
FIG. 5B illustrates an embodiment wherein the multiples are formed directly by a fixed set of cases without reference to standard arithmetic operations.

FIG. 5B illustrates an embodiment wherein the multiples are formed directly by a fixed set of cases without reference to standard arithmetic operations. For each of the required multiples the set of output values a*b is enumerated for each source channel value a. This allows for hardware circuit synthesis tools to determine an optimal logic circuit 507 to produce the full set of required multiples. Specification of the required output values for any given input value is typically made by enumeration in Verilog 'case' or 'casex' statements. This is distinct from a lookup table where the output values are stored and accessed via an index formed from the inputs because logic gates are used to implement the minimum subset of operations required to produce the full set of output values and redundant logic used to produce related subexpressions will be combined.

Which of methods 5A and 5B is most efficient in terms of space, frequency and power depends on specific values of A and B as well as the core efficiency of arithmetic operations vs arbitrary logic. Choice of which method to use may be based on direct observation, simulation or other criteria.

Figure 6:
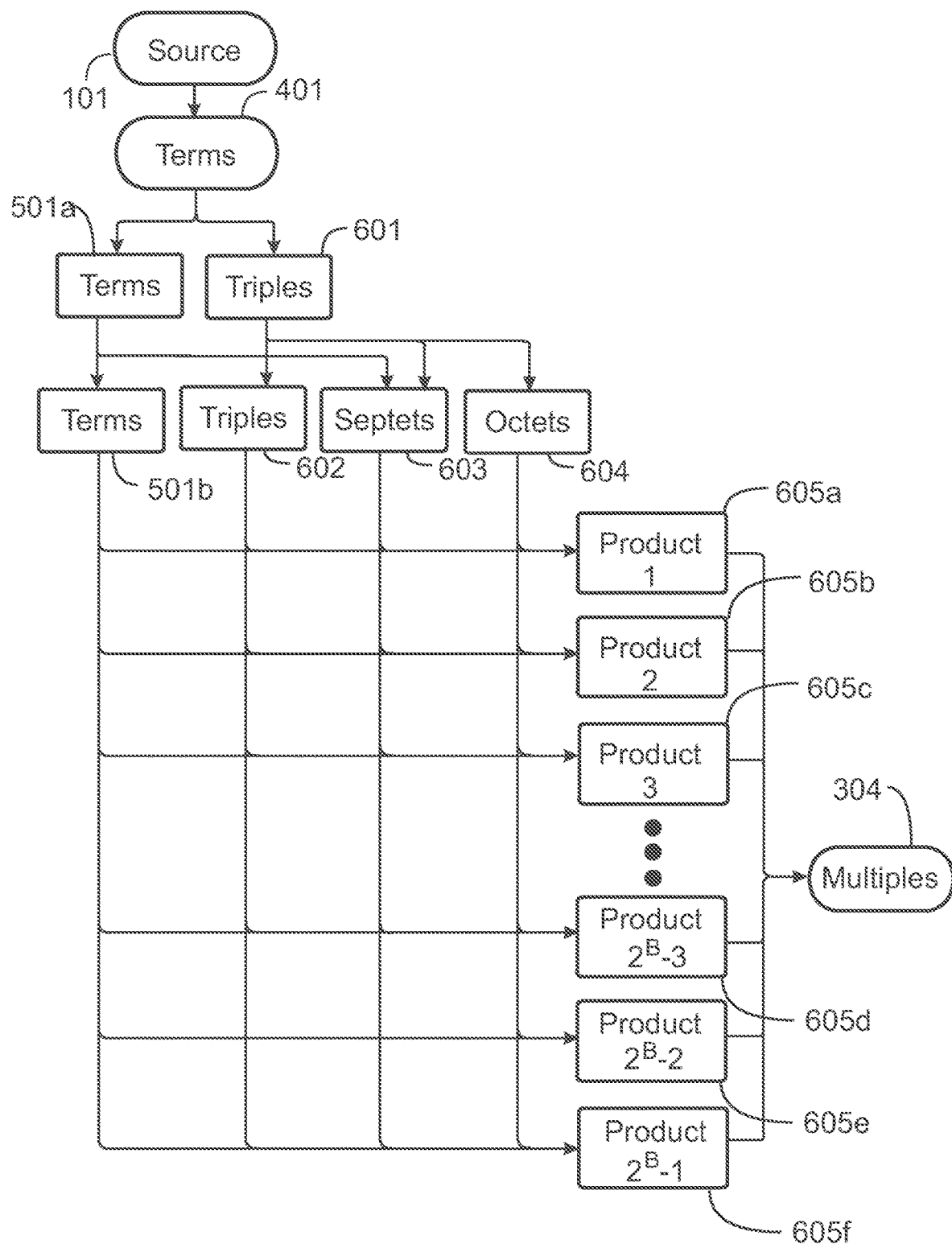
FIG. 6 illustrates a pipelined embodiment that maximizes circuit density by building sub-compositions from up to four-wise operations.

FIG. 6 illustrates an embodiment wherein the clock period is such that sufficient levels of logic allow for composition by addition and/or subtraction of four elements during each single clock period. By selecting from a set of sub-compositions, each product 605a though 605f may be produced by combining no more than four registered elements. As before, terms are retained in registers 501a and 501b, but triples 601 retained in 602 are composed directly from terms 401 and no pairs are used. Septets 603 and octets 604 are formed from triples 601 and retained terms 501a.

The example embodiment of FIG. 6 is sufficient to produce all required multiples where B=32. For larger multipliers, sub-compositions shown may be recombined four at a time in further pipeline stages to produce all required multiples for any value of B. The sub-compositions of elements shown are necessary and sufficient to produce all products where B=32 but other sub-compositions (perhaps chosen for consistency across different values of B) are acceptable.

When the set of multipliers is fixed, as is common for FPGA applications, then even a large, sparse set of multipliers may be efficiently implemented since common elements are merged and unused elements may be omitted. When synthesis tools perform this function automatically, an expression of a circuit may include all possible elements without explicitly declaring which multiples are used.

If operations on A+B or A+B+1 bit values cannot be completed in a single clock cycle, a multistage pipeline adder may be inserted for any single stage composition logic if extra pipeline registers are inserted as necessary such that all paths have the same number of clock periods. Pipeline stage periods may be instances of a single edge to edge clock transition, or a multicycle clock if throughput constraints allow. Neither multiple clock stages per operation nor use of multicycle clocking requires structural alteration to any embodiment other than the issues mentioned immediately above.

An important object of the invention is to provide to the industry mass multipliers implemented in integrated circuits, to be used in a variety of applications. Toward this end the inventor provides in one embodiment a mass multiplier implemented as an integrated circuit, the integrated circuit having a port receiving a stream of discrete values, and circuitry multiplying each value as received at the port by a plurality of weight values simultaneously, and an output channel providing products of the mass multiplier as produced.

In one version the discrete values received may be unsigned binary values of fixed width, the weight values may be unsigned binary of fixed width of two or more bits, and each multiple may be composed as a summation of bit-shifted duplicates of the input. In another version the set of shifted duplicates may be increased to allow the use of subtraction operations to reduce or otherwise optimize the circuit. Unused outputs of the set may be omitted either explicitly or implicitly.

In one embodiment the set of output products may be produced by combinatorial logic. In another the set of output products may be produced by a single stage pipeline, using single or multiple clock cycles. In another the set of output multiples may be produced by a multi-stage pipeline by combining no more than two addends per stage. Unused elements of the intermediate sub-compositions may be eliminated from the circuit either explicitly or implicitly.

In one embodiment the set of output products may be produced by a multi-stage pipeline by combining three or more addends per stage and the sub-compositions may be adjusted accordingly. Unused elements of the intermediate sub-compositions may be eliminated from the circuit either explicitly or implicitly.

Another object of the invention is to provide mass multiplication in integrated circuits to implement substantially improved convolutional neural networks in the ongoing evolution of deep learning and artificial intelligence. The inventor in this effort provides a first convolutional neural network (CNN) node, implemented as an integrated circuit, which has a first input channel defined as a stream of discrete values of a first component of an element of an array.

In this description the inventor intends the nomenclature of an element of an array to mean an element that may have a single component, or multiple components. A good example is an image, which may have pixels as elements, and each pixel may have a single component, if the image is monochrome, or three color values in one example, if the image is in RGB color. Each color value in this example is a component of the element, which is a pixel.

Continuing with the description above, of a first convolutional neural network (CNN) node, implemented as an integrated circuit, with a first input channel defined as a stream of discrete values of a first component of an element of an array, there is further in this CNN a first mass multiplier circuit multiplying the discrete values of the first component, as received, by a plurality of weight values simultaneously. An output channel provides an output stream of discrete values.

In one embodiment of the CNN node the first output stream is formed from products of the first mass multiplier circuit in some circumstances by combining products with constants and in some circumstances by applying an activation function.

In another embodiment the CNN node further comprises a second input channel defined as a stream of discrete values of a second component of the element of the array, and a second mass multiplier circuit multiplying the discrete values of the second component, as received, by a plurality of weight values simultaneously. In another embodiment there may be a third input channel defined as a stream of discrete values of a third component of the element of the array, and a third mass multiplier circuit multiplying the discrete values of the third component, as received, by a plurality of weight values simultaneously.

Having described a CNN node having one, two or three input component streams and dedicated mass multipliers, the inventor further provides a convolutional neural network (CNN) that has a first convolutional neural network (CNN) node, implemented as an integrated circuit, comprising input channels defined as streams of discrete values of components of elements of an array, mass multiplier circuits dedicated to individual input channels, multiplying the discrete values of components, as received, by a plurality of weight values simultaneously, and an output channel providing an output stream of discrete values, and a second CNN node having input at least partially dependent on output of the first node. This CNN may have successive nodes and may operate as a deep neural network (DNN). There is no requirement that successive nodes after the first node be CNN nodes.

Pipelined Aperture Function Operations

Referring now back to earlier description in this specification, discussing order of operations in processing a CNN or other similarly chosen aperture function that passes an array of computation sub-functions over an array of inputs to produce a net result, specific description is now provided of an everted form of aperture function operations in an embodiment of the present invention that accepts inputs as a stream and produces outputs as a stream. In this embodiment of the invention inputs are not, and need not be, buffered in RAM because each input is referenced only once. Outputs are also produced in a stream, so the output stream may be processed by a subsequent layer without RAM buffering. The inventor believes this innovation substantially increases processing speed over many otherwise necessary read and write operations to RAM in other systems of processing.

Apparatus and a method are provided in an embodiment of the invention wherein action of passing a two-dimensional aperture function over a two-dimensional array is accomplished by acting on an incoming stream of inputs such that all inputs are processed immediately and partially completed computations are retained until such time as all required inputs are received and processed, and the output is produced in a conformant stream with typically identical or lower data rates to the input stream. All inputs are accepted and processed at the rate provided and are not required to be stored or accessed in any order but in the order presented. If the application of the aperture function is defined such that more outputs are produced than inputs, the circuit can still operate at incoming data speed by selecting a processing clock rate at a sufficient increase such that the system never fails to accept and process an input when presented.

The conventional way to implement a convolution of a kernel or more general aperture function against a larger input array is to gather the required input patch, apply the function to the inputs and output the result. As the aperture is passed over the input array, each succeeding patch will overlap with the one just processed so some inputs may be retained and reused. Various mechanisms such as FIFOs may be used to avoid reading the inputs redundantly from source storage as the patch advances to each new row, but the source data will still be applied to each position in the kernel in turn to produce each output whose input patch overlaps with each specific data input position.

If there are many output channels and many independent aperture functions to be computed, a mass multiplier may be used to provide products of the patch of input values under consideration to all of the aperture functions in parallel. But with this arrangement and order of operations, each position of source data will require a set of products for each position in the kernel as it is combined into the various output positions that overlap.

A mechanism of the instant invention is to evert, that is, to turn inside out, the order of operations for specific advantage of using a single mass multiplier per input channel applied to a given input value only once. Rather than retaining or rereading source values for later use in the form of computing later products, the process in an embodiment of the instant invention computes all required products of each input when presented and retains a running total for each element of the aperture function that is complete up to the point in which the current input appears.

Any aperture function that can be mathematically decomposed into a series of sub-functions that are applied in sequence can be implemented in this fashion. Since CNN kernels are simply a sequence of additions of the products of weights times inputs, and the order of the operations is compatible with the order of the source inputs taken left to right, top to bottom, the mechanism can easily be applied.

In an embodiment of the invention an array of compositors is implemented on an IC, corresponding to the sub-functional elements of the aperture function, each keeping a running total of the value of the aperture function as it progresses over the input stream. The final compositor in the array outputs the complete value of the function, and all other compositors output a partial value of the function.

In the simple case of application of a 3 by 3 kernel, the output of the upper left compositor reflects the first element of the kernel applied to current input plus any initialization constant, the output of upper middle compositor reflects the first two steps, and the output of the upper right compositor reflects the first three steps. The output of the upper right compositor needs to be delayed until it can be used again by the next row. The next row of compositors continues the pattern of accepting a partially completed function value adding the contribution of each new input and passing it forward. The last row of compositors completes the last steps of the function and outputs the completed value for any further processing.

Noting that the progression of partial values of the function between compositors is generally from left to right in a first row, then left to right in succeeding rows, to finally a last compositor in the last row, one may consider the flow of partial values is a stream and refer to compositors and flow as upstream or downstream.

At all times, each compositor maintains the partial sum of the aperture function up to and including the current source input. Each compositor is always working on a different patch position of the output, specifically that patch where the current input appears in the compositors' relative position in the aperture sub-function array.

If a 3×3 kernel is expressed as a function of inputs A as $$A = \begin{bmatrix} a_{11} & a_{12} & a_{13} \\ a_{21} & a_{22} & a_{23} \\ a_{31} & a_{32} & a_{33} \end{bmatrix} W = \begin{bmatrix} w_{11} & w_{12} & w_{13} \\ w_{21} & w_{22} & w_{23} \\ w_{31} & w_{32} & w_{33} \end{bmatrix}$$

$$u(A,W) = k + a_{11}w_{11} + a_{12}w_{12} + a_{13}w_{13} + a_{21}w_{21} + a_{22}w_{22} + a_{23}w_{23} + a_{31}w_{31} + a_{32}w_{32} + a_{33}w_{33}$$

The function implementing the kernel can be decomposed into equivalent sub functions $$v_0(a_{11}) = k + a_{11}w_{11}$$

$$v_1(t, a_{12}) = t + a_{12}w_{12}$$

$$v_2(t, a_{13}) = t + a_{13}w_{13}$$

$$v_3(t, a_{21}) = t + a_{21}w_{21}$$

$$v_4(t, a_{22}) = t + a_{22}w_{22}$$

$$v_5(t, a_{23}) = t + a_{23}w_{23}$$

$$v_6(t, a_{31}) = t + a_{31}w_{31}$$

$$v_7(t, a_{32}) = t + a_{31}w_{32}$$

$$v_8(t, a_{33}) = t + a_{31}w_{33}$$

$$u = v_8(v_7(v_6(v_5(v_4(v_3(v_2(v_1(v_0(a_{11}), a_{12}), a_{13}), a_{21}), a_{22}), a_{23}), a_{31}), a_{32}), a_{33})$$

$$u = (((((((((k + a_{11}w_{11}) + a_{12}w_{12}) + a_{13}w_{13}) + a_{21}w_{21}) + a_{22}w_{22}) + a_{23}w_{23}) + a_{31}w_{31}) + a_{32}w_{32}) + a_{33}w_{33})$$

$$u = k + a_{11}w_{11} + a_{12}w_{12} + a_{13}w_{13} + a_{21}w_{21} + a_{22}w_{22} + a_{23}w_{23} + a_{31}w_{31} + a_{32}w_{32} + a_{33}w_{33} = u(A,W)$$

The circuitry required to compute those sub-functions is then arranged in a corresponding array of compositors $$\begin{bmatrix} v_0 & v_1 & v_2 \\ v_3 & v_4 & v_5 \\ v_6 & v_7 & v_8 \end{bmatrix}$$

and the partially completed sums are maintained as the output value of the compositors $$v_0 = k + a_i w_{11}$$

$$v_1 = k + a_{i-1} w_{11} + a_i w_{12}$$

$$v_2 = k + a_{i-2} w_{11} + a_{i-1} w_{12} + a_i w_{13}$$

$$v_3 = k + a_{i-3} w_{11} + a_{i-2} w_{12} + a_{i-1} w_{13} + a_i w_{21}$$

$$v_4 = k + a_{i-4} w_{11} + \ldots + a_{i-1} w_{21} + a_i w_{22}$$

$$v_5 = k + a_{i-5} w_{11} + \ldots + a_{i-1} w_{22} + a_i w_{23}$$

$$v_6 = k + a_{i-6} w_{11} + \ldots + a_{i-1} w_{23} + a_i w_{31}$$

$$v_7 = k + a_{i-7} w_{11} + \ldots + a_{i-1} w_{31} + a_i w_{32}$$

$$v_8 = k + a_{i-8} w_{11} + \ldots + a_{i-1} w_{32} + a_i w_{33}$$

Where $a_i$ is the current value from the input stream and $a_{i-1}$ through $a_{i-8}$ in each case are the previously processed inputs for the specific patch where $a_i$ appears in the position relative to the output of each individual compositor. Each compositor will compute the value of the aperture function up to and including the position that the compositor corresponds to in the aperture array. Each compositor takes the current value of the input stream and combines it with previous values to produce a different partial sum corresponding to the partially processed patch in the input array where the current input value appears in the relative position of that patch corresponding to the position of each compositor in the aperture function.

In this way the partial values of the aperture function, computed in the standard order ad precision, will be maintained over time on the input stream until the completed values are ready to output.

While this technique is quite straightforward within the interior of the input array, complications arise when applied to patches that overlap the edges of the input array as the aperture function is defined differently when all inputs are not available. In the case of a CNN kernel, the additional operations are dropped, equivalent to using zeros as inputs. The instant invention is concerned with maintaining a steady flow of partial sums through the compositors while processing those exceptions, as described below.

Figure 7:
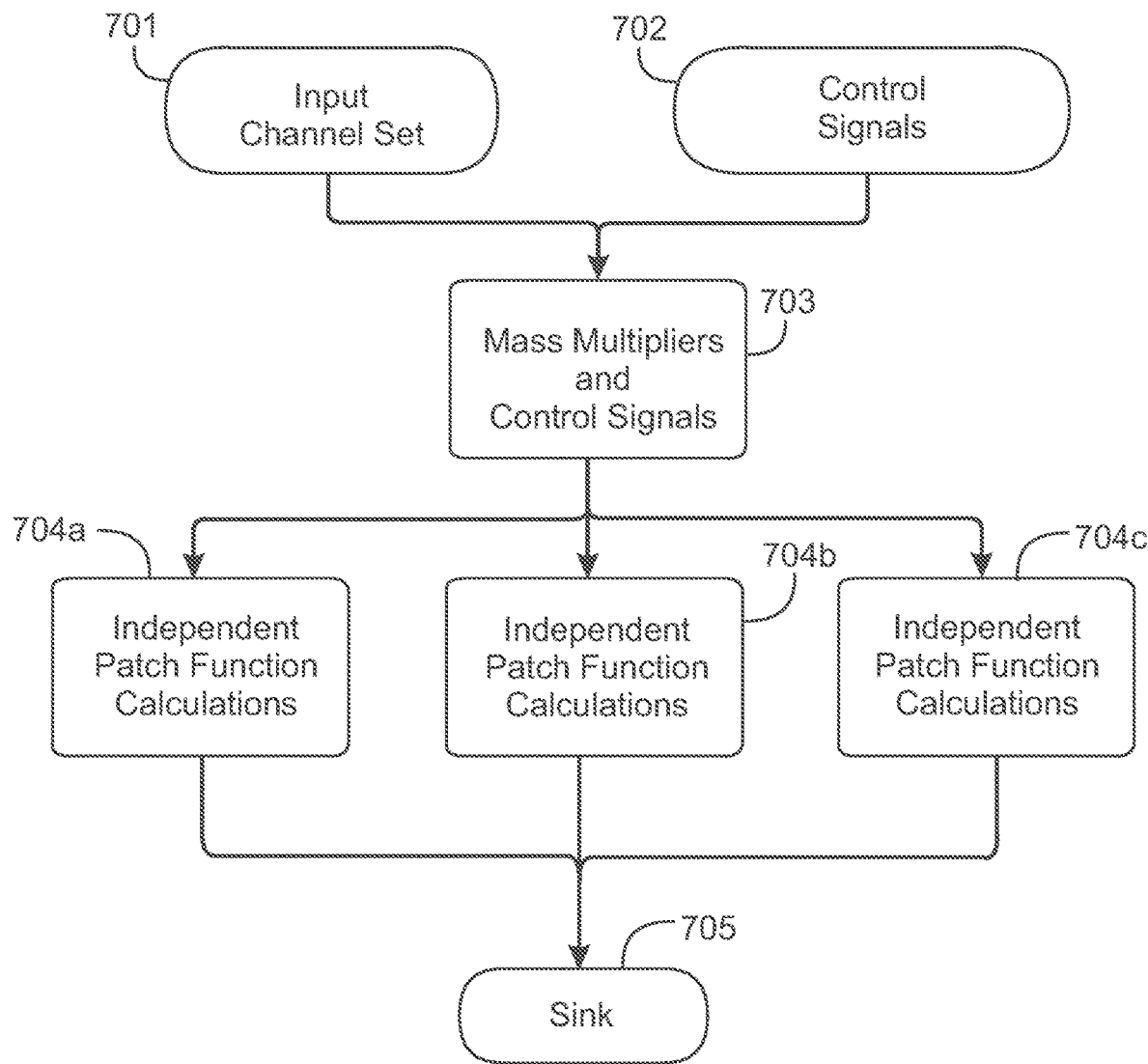
FIG. 7 is a diagram illustrating structure and connectivity in an embodiment of the invention receiving an input stream, preprocessing the input stream, and feeding results through a unique digital device to produce an output stream.

FIG. 7 is a diagram illustrating structure and connectivity in an embodiment of the invention receiving an input stream, preprocessing the input stream, and feeding results through a unique digital device to produce an output stream.

Input channel set 701 and associated control signals 702 are used by common circuitry 703 to produce any and all products of the input channel set with weights for subsequent sub-functions. The source channel products are then distributed to a bank of sub-function calculation circuits 704a, 704b, and 704c, each of which produces a single channel of an output channel set 705. Any number of independent output channels may be supported by the common circuitry 703.

Figure 8A:
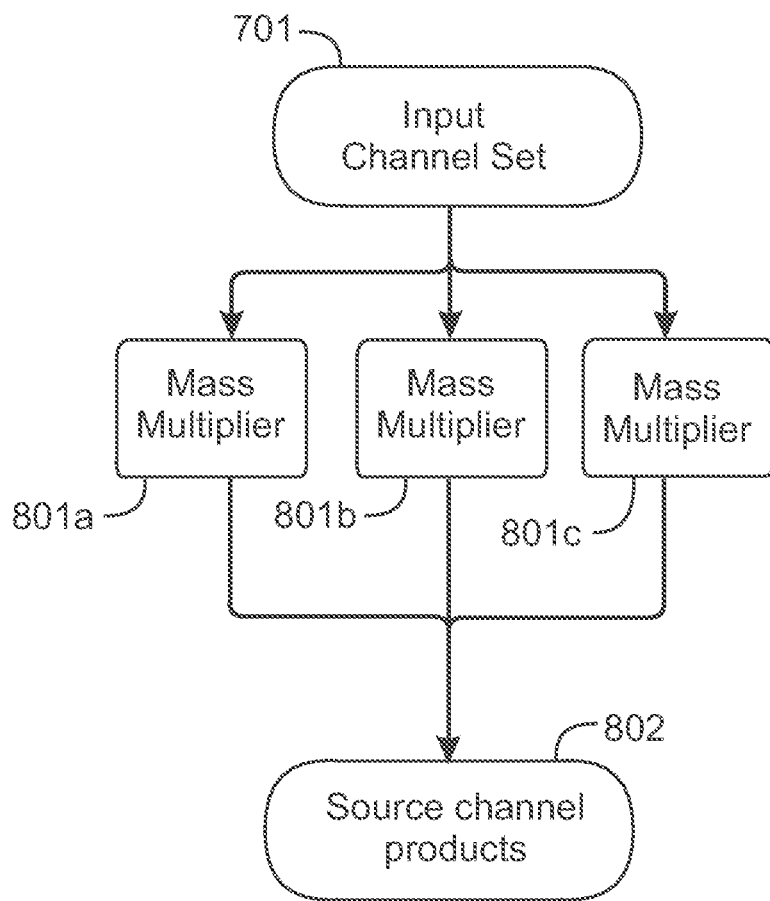
FIG. 8A is a diagram illustrating structure and connectivity producing source channel products.
Figure 9A:
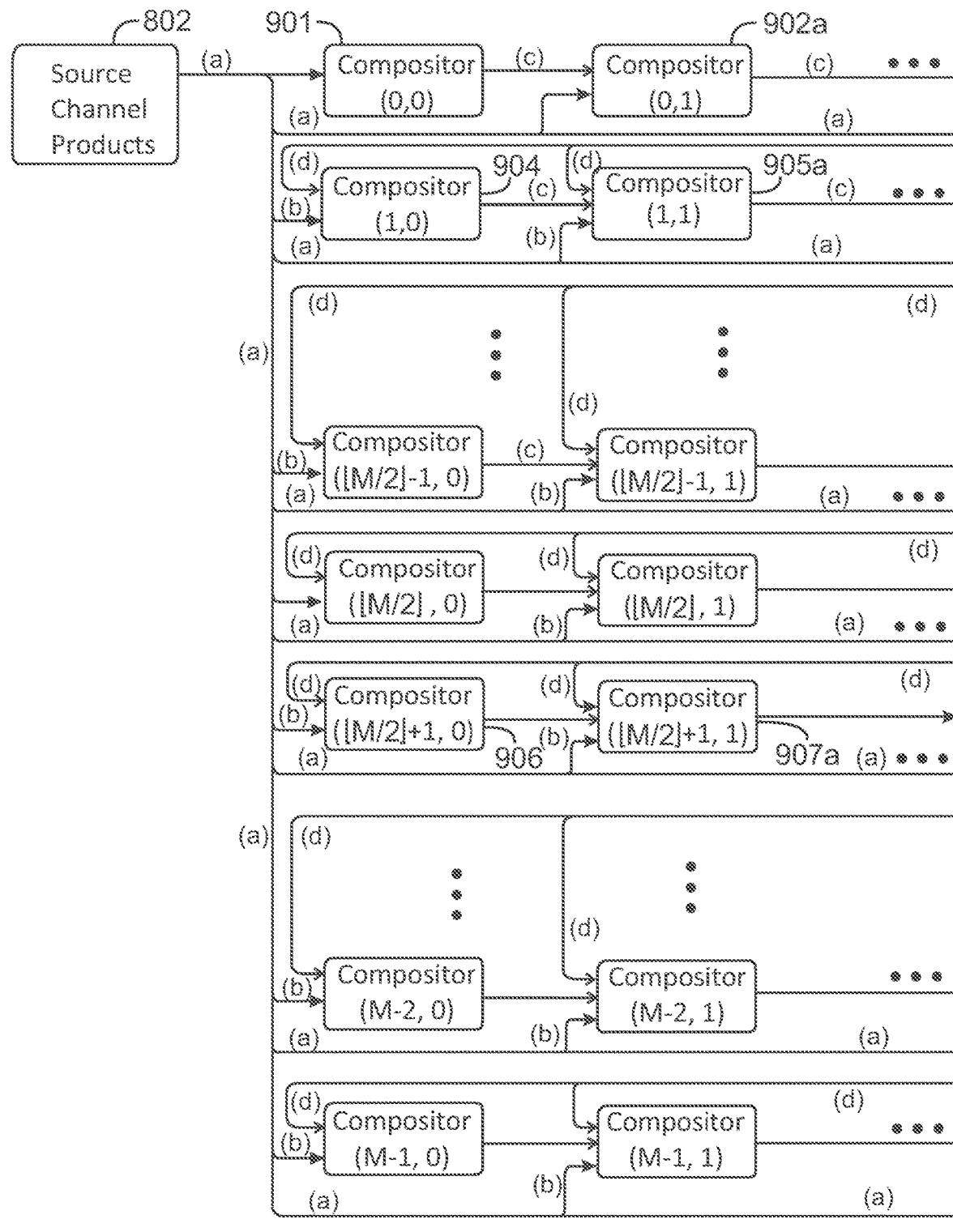
FIG. 9A is a partial illustration of a general case of pipelined operations in an embodiment of the invention.
Figure 9B:
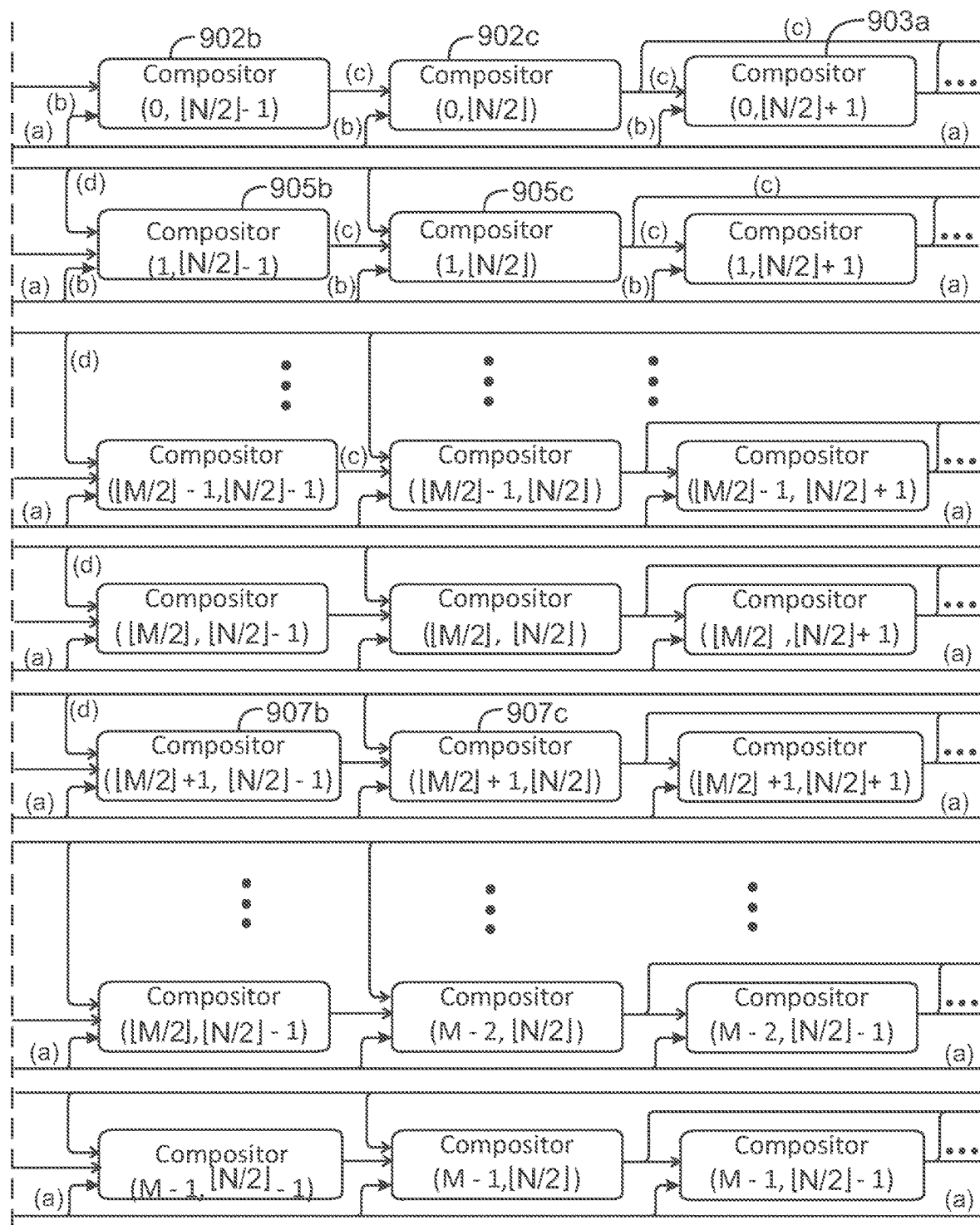
FIG. 9B is another partial illustration of the general case of pipelined operations in an embodiment of the invention.
Figure 9C:
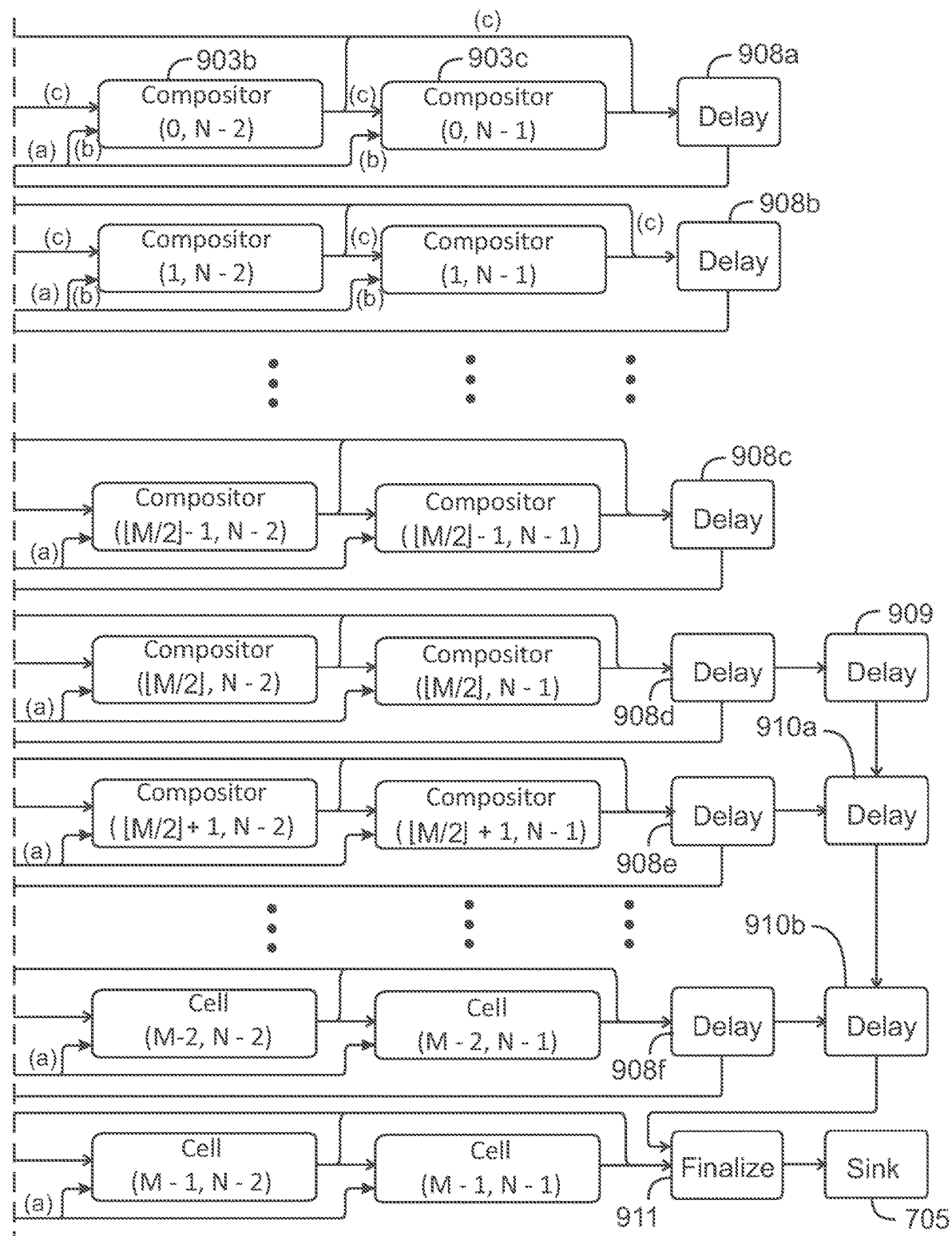
FIG. 9C is another partial illustration of the general case of pipelined operations in an embodiment of the invention.

FIG. 8A is a diagram illustrating mass multipliers 801a, 801b, and 801c, in common circuitry 703 of FIG. 7, that take each channel of input channel set 701 and produce either a sparse or a complete set of multiples as required by the defined sub-functions. It is to be noted that this illustration assumes three channels in an input channel set, as may be the case for such as red, green and blue pixel values in processing RGB images. In other embodiments there may be one, two, or more than three channels. Any or all of products 802 (multiples of source input array values constructed by the mass multipliers) may be made available to compositors as shown in FIGS. 9A, 9B, 9C described in enabling detail below. Compositors are instances of hardwired circuitry in the unique device of the invention that perform sub-functions on the source channel products produced by the mass multipliers of FIG. 8A.

Figure 8B:
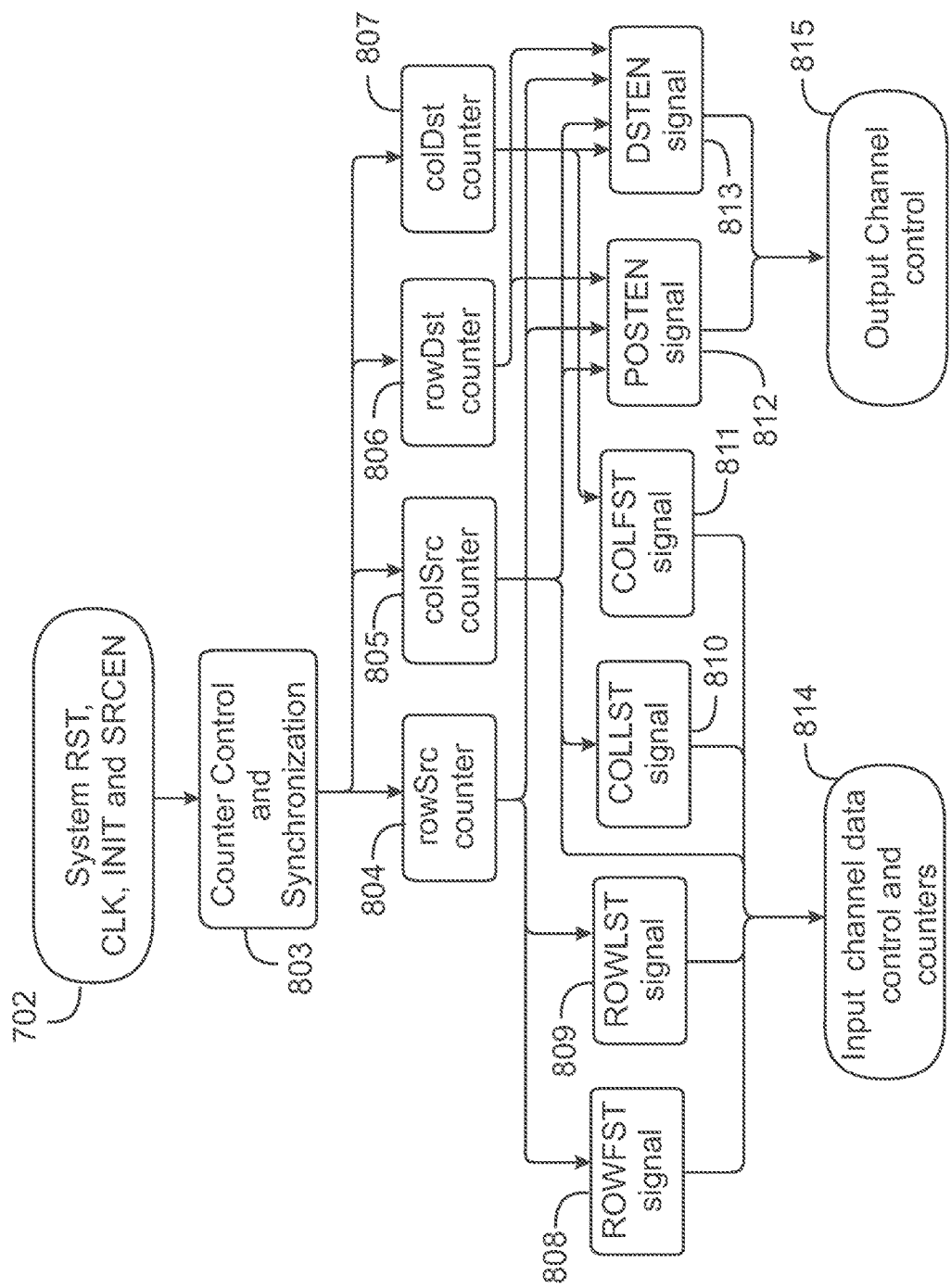
FIG. 8B is a diagram illustrating additional detail of control apparatus and functions in an embodiment of the invention.

FIG. 8B is a diagram illustrating structure of synchronization circuitry that provides both normal and exception handling signals to all compositors of all output channels.

Control circuitry 803 synchronizes all output and control counters to the source input stream and implements setting the output and control counters to an initial state whenever RST or INIT is asserted.

A colSrc counter 805 in this example counts out the inner dimension of the array column by column across a row and advances as each set of source channel products is processed. At the end of each row the colSrc counter returns, in this example, to the leftmost position (0) and a rowSrc counter 804 is advanced by one. At the end of the source array stream, the rowSrc and colSrc counters are returned to the initial state and are prepared to receive a new array of inputs.

In this example a colDst counter 807 and rowDst counter 806 together act in a similar manner as the counters for all output channels. The colDst and rowDst counters are enabled by an output enable signal (DSTEN) 813 and determine when a post processing enable signal (POSTEN) 812 is asserted.

It is to be noted that the system depicted in this example produces a single output of an aperture function but will normally be used to produce a stream set of channel outputs compatible with the dimensions of the source input stream. Each independent output channel will share at least some of computation circuitry via the mass multipliers and common control logic.

An output-enable (DSTEN) signal 813 controls when a finalization function accepts and processes results from the compositors. While the first several rows are accepted from the source input array, no valid results are presented to the finalization function (see FIG. 9C). Output enable signal 813 (DSTEN) is asserted when either the rowDst and colDst counters indicate that valid results are available or alternatively when processing delayed truncated results. POSTEN signal 812 is asserted continuously or periodically to conform to the timing of the SRCEN signal 801. These signals are required to sequence final outputs of all truncated compositors when processing the last row of the source input stream array. Each row of compositors from $\lfloor M/2 \rfloor$ to $M-2$ will produce final truncated outputs simultaneously with the last full outputs which must be retained and emitted sequentially after all full patch outputs in order to conform to the array stream format.

In this example the POSTEN and DSTEN signals, and colDst, and rowDst counter values are independent of the SRCEN signal and colSrc and rowSrc counter values and continue to process delayed results until all delayed results have been finalized and sent to the output stream. The system may accept new inputs while the previous outputs are completed, thus allowing the system to process multiple frames of the source input stream without pausing between the frames. While source stream data has not reached the end of the array, POSTEN is not asserted, and final results are taken from the compositors. Immediately after reaching the end of the source array, the POSTEN signal is asserted for each additional output and final results are taken from truncated delay lines 909, 910a, and 910b as shown in FIG. 9C described below, until the rowDst counter reaches the full number of output rows, whereupon rowDst and colDst are reset to initial conditions in preparation for a next frame of data.

A first row signal 808 (ROWFST) is asserted when the rowSrc counter indicates that the source data set from the stream represents the first row of the array.

A last row signal 809 (ROWLST) is asserted when the rowSrc counter indicates that the source data set from the stream represents the last row of the array.

A first column signal 810 (COLFST) is asserted when the colSrc counter indicates that the source data set from the stream represents the first column of each row of the array.

A last column signal 811 (COLLST) is asserted when the colSrc counter indicates that the source data set from the stream represents the last column of each row of the array.

FIGS. 9A, 9B and 9C illustrate the unique device mentioned above in a general case wherein M by N sub-function elements of an aperture function are applied to each overlapping M by N patch of an array of R by C inputs, including those that overlap the edges, the inputs presented as a stream of associated components at regular or irregular time intervals to produce a corresponding stream of R by C outputs wherein each output is the aggregate effect of the M by N functional elements applied to the input patch as specified by rules of an aperture function. The functional elements applied to each position in the array is in this device a hardwired compositor for each of the M by N sub-functions, as shown in the composite of FIGS. 9A, 9B and 9C.

The effect of the circuit is to compute the recomposed value of an aperture function at each position of the array of R by C inputs with an identical sequence of operations as would be used to compute an aperture function over each patch individually. If any positions are not desired in the output stream, circuitry can be added to omit them to produced tiled or spaced outputs rather than fully overlapping.

Source channel products 802 and source control signals 814 are made available to each of compositors 901, 902a, 902b, 902c, 903a, 903b, 903c, 904, 905a, 905b, 905c, 906, 907a, 907b, and 907c. Source control signals are also connected to delays 908a, 908b, 908c, 908d, 908e, and 908f. Output channel control and counters 815 are made available to delays 909, 910a, and 910b, as well as finalization function 911. Additional pipeline stages may be inserted by hand or by automated tools to make circuit routing feasible for a given clock frequency if and only if the order of operations is not altered. The timing control and counter signals are available to all elements of the circuit and are not individually shown.

Each compositor has a dedicated direct connection to either specific input products, or alternatively to a programmable multiplexor that selects one of the products for each input value in the set and is preconfigured before execution of the circuit. Each dedicated connection is a parallel pathway with a plurality of wires sufficient to carry the bits expressing the products required in a single input interval. The use of an optional preconfigured multiplexor to select which product for each set element is sent to each compositor allows for upgrade of the weight values in the field. A fixed connection is used when the weights are not to be upgraded and remains fixed for the lifetime of the device. As the selection of weights does not change during operation, the choice of fixed or variable product selection does not affect the operation of the circuits.

Each compositor receives the set of products corresponding to the weights of the sub-function, one per input channel, from the mass multiplier and performs the sub-function computation, typically simply adding them all together, to form the contribution of this compositor to the value of the overall aperture function. Each compositor, except those corresponding to the left column of the aperture function, also receives partially completed results from the compositor to the immediate left. Each compositor, except those corresponding to the top row of the aperture function, may also receive delayed partially completed results from the compositor on the row above. Each compositor has, at most, one connection from the left, and one delayed connection from above, each connection of which is a parallel pathway with a plurality of conductors sufficient to carry the bits expressing the partially completed results as input to the compositor. As per the definition of the subfunction with respect to the position of the current input patch relative to the edges of the input array, each compositor performs one of three operations: combination of this compositor's partial result with initialization values, if any, or combination of this compositor's partial result with partial results from the compositor to the left, or combination of this compositor's partial result with delayed partial results. The amended result is placed into an output register of a plurality of bits sufficient to contain the result and make that available in the succeeding input interval to the compositor to the right and/or the delay and finalization circuitry. This amended result may be either a partial result, a complete result, or a truncated result, depending on the position of the compositor in the aperture function and the state of the input stream position.

Compositor (0, 0) is unique in that no compositors exist to the left or above in the aperture function and so always initializes the computation with each input set received.

Compositor (M-1, N-1) is unique in that the result produced is always a final result but is structurally identical to all other compositors 903a, 903b, or 903c.

Some compositors' outputs are tapped for delay or post processing in which case the width of the pathway through such delay or post processing is sufficient to transport the bits expressing the partial, truncated, or completed result. Some compositor's outputs are only used by the compositor to the right. The computation internal to the compositor and output data format does not require alteration depending on the use of the output.

The finalization circuit takes the result from the several possible sources and multiplexes them to select which to process on any interval. After applying the finalization function, if any, the width of the final output may be reduced and will form the output stream of the instant embodiment which may either be the input stream of the next, the final outputs of the system containing the invention or may be used in further processing.

Data paths on the unique device in embodiments of the invention are indicated in FIGS. 9A, 9B and 9C by bold lines with direction indicated by arrowheads, and an ellipsis indicates where the last column or row in the range is repeated in its entirety. Data path (a) from source channel products 802 is a set of parallel conductive pathways, one pathway dedicated to each product of an input component, each product being the value of the input component multiplied by one of the plurality of weight values of the aperture function. It should be apparent that a 5 by 5 aperture function has 25 weight values for each input component. For the circumstance of an aperture function for an R by C input array of R, G and B color pixels, then, there are 75 weight values. Line (a) thusly, in this circumstance has 75 parallel pathways, each pathway a set of parallel conductors of a width to accommodate the desired number of bits for accuracy. Line (a) is termed in the art a set of point-to-point connections, as opposed to a bus.

Data paths (b) in FIGS. 9A, B and C are not extensions of line (a), but dedicated connections to a specific subset of the pathways in line (a). Lines (b) are not marked in every instance in FIGS. 9A, B and C, but every connection from line (a) directly to an individual one of the compositors is a dedicated line (b). The dedication is that each compositor is connected to that subset of pathways that carry the products of each input component and weight values required by that compositor.

Data paths (c) in FIGS. 9A, B and C are point-to-point paths between output registers in each compositor and a next compositor to the right. These are dedicated pathways of the accuracy width that carry typically a partial sum, as is described in enabling detail elsewhere in the specification. Not every path (c) is marked in the figures, but it may be assumed that in this example that every direct connection from one compositor to another is a pathway (c). Note that there are instances where output pathways (c) branch to alternative circuitry.

Another distinct data path in an embodiment of the invention is marked (d) in FIGS. 9A, B and C. These are dedicated data paths from delay circuits such as circuits 908A thru 908f, either back to compositors down a row and to the left, or directly to other delay circuits. The delay circuits are fashioned to accept partial sums at a right end of a row of compositors, to delay passing on the partial sums for a specific number of source intervals, and then to pass those partial sums to another compositor and/or other processing at a proper time. The overall functionality is described in enabling detail elsewhere in this specification. Pathways (d) between delay circuitry are similarly dedicated pathways for typically partial sums to be passed at certain source intervals.

If either of M or N is reduced such that no last rows or columns of a range are required, the ending elements are omitted and the implementation of the first row or column in the range is retained. In a degenerate case where one or both of M or N is reduced to 2, the first and last rows or columns are retained, and the intermediate rows or columns are omitted. In a degenerate case where one of M or N is reduced to 1, the implementations of first and last compositor are combined, and special initialization is not required. In the specific case where both M and N are 1, eversion of the aperture function is not required but the usage of the mass multiplier still affords distinct advantage.

Source channel products 802 may be any set of binary values presented contemporaneously associated with a specific position of the R by C array and in some predefined sequence. The source channels of the input stream can be any combination of integer or fractional values in any format of whatever nature is defined for the inputs of an aperture function. One example is pixel values from one or more video frames and/or any other sensor values scaled to match the array size R by C as well as feature component values produced as output of CNN layers. It is emphasized that each node that embodies this invention may accept output from other nodes in addition to or in place of primary source inputs. While it is common for the first node, or nodes, in an embodiment of the invention to accept image pixels as the primary input of the system, there is no restriction on the nature of the data processed if it can be formatted into a stream representing an R by C array.

In one embodiment of the invention, source stream element sets may be presented in row-first order with each succeeding column presented in strictly ascending order. In some embodiments of the invention the rows and columns need not correspond to horizontal or vertical axes, but may be arbitrary, as in scanning up or down the columns and right to left. Rows R and columns C here simply refer to the major and minor axes of the stream format. The circuitry need not be adjusted for input signals that produce the input stream in orientations other than standard video left-to-right, top-to-bottom ordering. The orientation of the aperture sub-functions can be made to conform to produce identical outputs for each input array position.

In this example source inputs, which are products of source values and weights as required by an aperture function, are presented by a signal (SRCEN See FIG. 8B) indicating when each new set of elements is valid. Input may be paused and resumed at any time. In some instances, a minimum interval between inputs may be defined, and the circuit may use multicycle or higher speed clocks to reduce size, power or otherwise take advantage and the output channel set may use the same minimum interval.

Common control and synchronization circuitry 803 (FIG. 8B) provides counters and control signals that describe the current input position in the R by C array. The counters may continue running for extra rows and columns after the final input to assist a finalization function 911 (FIG. 9C) to output accumulated outputs generated in excess of input columns by the last row of input. (See FIGS. 12, 13, and 14 and description below) Control signals are available to all other elements and are not shown in FIGS. 9A, 9B and 9C.

Compositor circuits 901, 902a, 902b, 902c, 903a, 903b, 903c, 904, 905a, 905b, 905c, 906, 907a, 907b, and 907c each compute that part of the aperture function assigned to their positions in the M by N function. All compositors operate on the same source channel set and on the row and column counter states as provided by control 803. Details of the data handling of the aperture function are described further below with reference to additional figures.

As source input sets are received from the input stream, partially completed computations of the aperture function as applied to all patches that overlap with the current position in the input stream are passed from left to right and top to bottom within the M by N array of compositors. This operation accumulates the full computation of the aperture function over time, and outputs the correct implementation of the aperture function over each patch of the input array producing the same result through the identical order of operations as would be the case if the aperture function were implemented by reading the input values directly from the array. Replacement of random access to the array with stream access is an important feature of the invention and eliminates the requirement for redundant access to a random-access memory.

At the right-side columns $\lfloor N/2 \rfloor$ through N-1 of the compositors, exclusive of the bottom row, partial outputs are passed to delay stages 908a, 908b, 908c, 908d, 908e, and 908f where they are held for the number of input intervals needed, such that they can be utilized in further computations of the same logical patch position when inputs are received corresponding to lower rows of the patch.

When processing the last column C-1 of each input row, all compositors from columns $\lfloor N/2 \rfloor$ to N-1 and rows 0 to M-2 also represent the last computation for that row of the patches that include the last column of the input array, and their values are forwarded to delay stages 908a, 908b, 908c, 908d, 908e, and 908f and require special processing to be inserted in the sequence, such that they will be available at the correct time to continue computing the aperture function when subsequent input rows are received. See FIG. 11 and associated description.

In this example compositor 903c at the (M-1, N-1) position always produces a completed accumulation of the M by N sub-function elements but is otherwise indistinguishable from other compositors of that configuration 903c. As above, when processing the last column C-1 of each input row, all compositors from columns $\lfloor N/2 \rfloor$ to N-1 on row M-1 also represent completed but truncated accumulations of the aperture function elements and are sent directly to finalization function 911 for processing to be inserted into the output stream.

In this example while processing the last row R-1 of inputs, compositors in column N-1 from row $\lfloor M/2 \rfloor$ to M-1 also represent completed but truncated accumulations of the sub-function element computations and are sent to truncated outputs delay lines 909, 910a, and 910b and retained until the primary outputs from row M-1 have been finalized at 911. With control signals as shown in FIG. 8B, additional M-$\lfloor M/2 \rfloor$ rows of truncated outputs are transferred from delay lines 909, 910a, and 910b and finalized 911, and ultimately provided at any required timing interval to the output stream sink 705.

Figure 15:
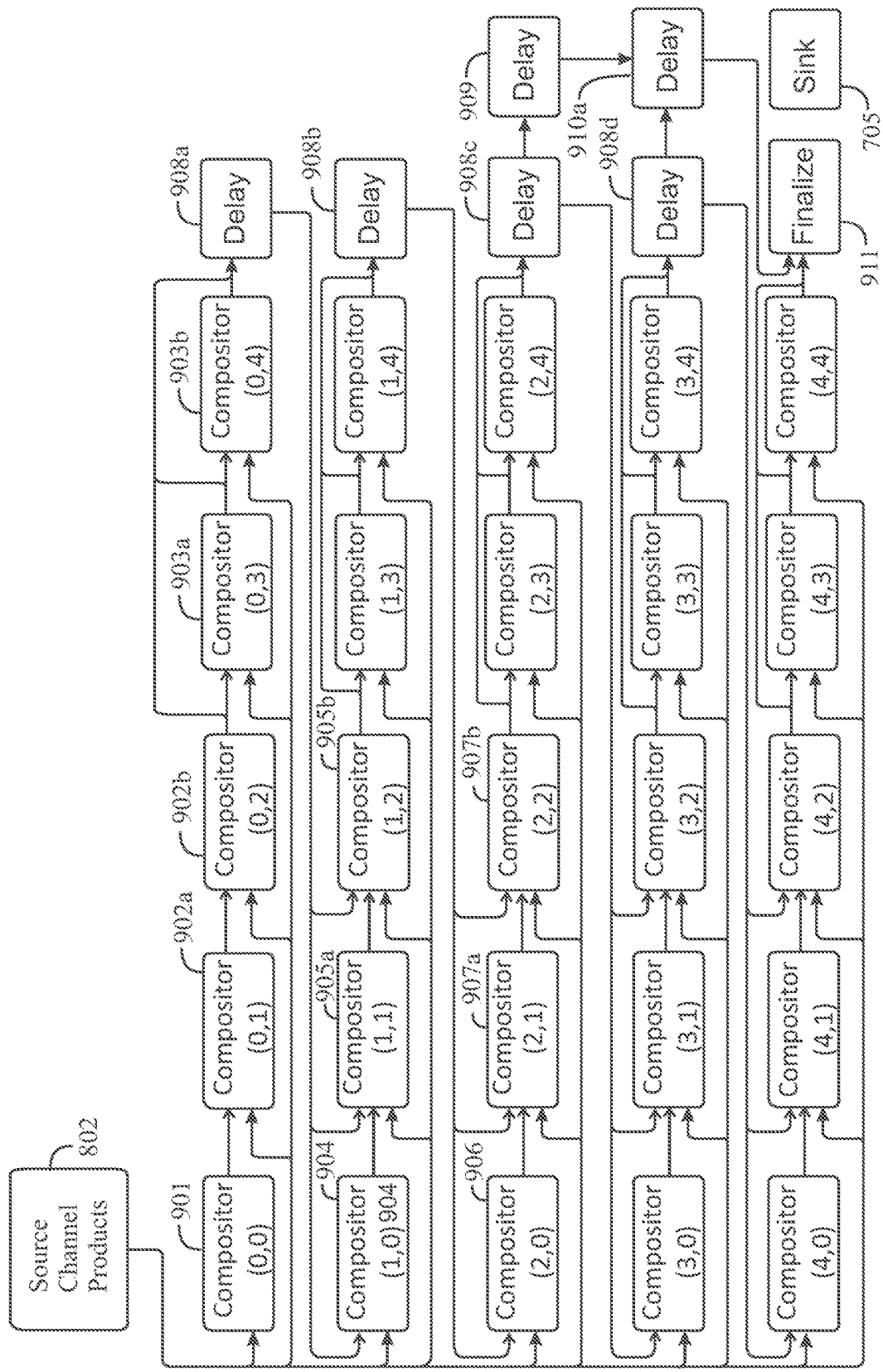
FIG. 15 is a diagram illustrating a specific case of pipelined operations in an embodiment of the invention that implements a 5 by 5 convolution node.

FIG. 15 is a diagram illustrating the specific case of pipelined operations in an embodiment of the invention that implements a 5 by 5 convolution node.

Source channel products 802 and source control signals (not shown here) are made available to each of compositors 901, 902a, 902b, 903a, 903b, 904, 905a, 905b, 906, 907a, and 907b. Source control signals are also connected to delays 908a, 908b, 908c, and 908d. Output channel control and counters are made available to delays 909, 910a, as well as finalization 911. Additional pipeline stages may be inserted by hand or by automated tools to make circuit routing feasible for a given clock frequency if and only if the order of operations is not altered. The timing control and counter signals are available to all elements of the circuit and are not individually shown.

As each set of source channel products is presented in turn, each compositor selects the appropriate product to compute the sub-function that corresponds to the position in the aperture function. Each 5 by 5 patch that intersects with the current position in the input array is amended to include the computation based on the products of that position. The net effect is that the single source stream of inputs is transformed into a parallel set of 5 by 5 streams of partial computations that are passed between the compositors until each time that all operations on a patch are complete, which normally occurs in compositor (4, 4) and sometimes others when processing the right or lower edges of the input array.

Note that only the width of the input array affects the size of the delay elements as each must delay partial results for the number of source input intervals that correspond to receiving an input of one column and the input at the same column on the next row.

Figure 16:
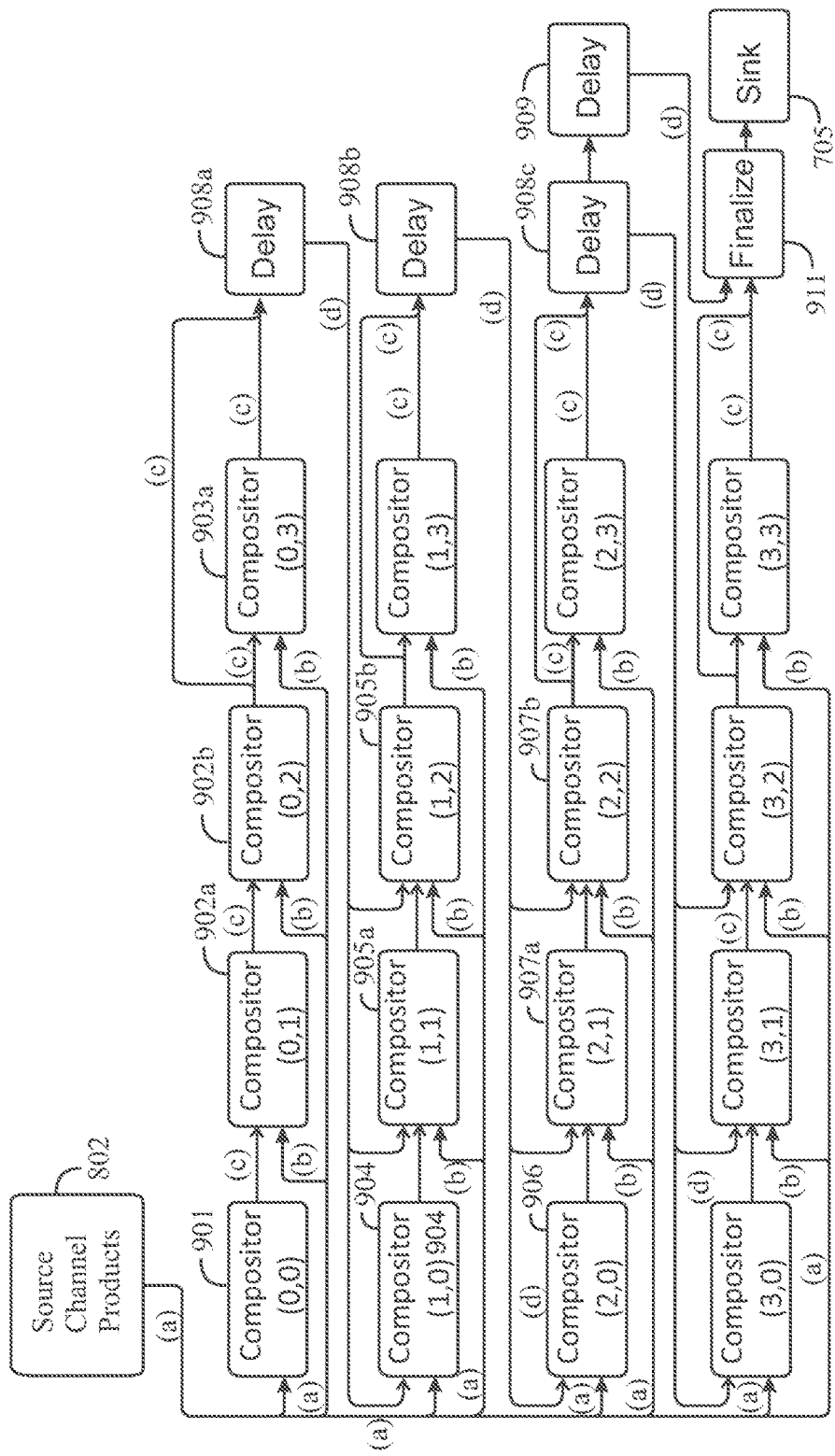
FIG. 16 illustrates an IC in an embodiment of the invention for a 4×4 aperture function.

FIG. 16 illustrates a 4×4 embodiment of the IC of the invention. It is known that kernels may have odd numbers of sub-functions in a row or column, or even numbers. This even version is degenerate in the sense that element 910* as shown in the general case in FIG. 9C, and in FIG. 15 for the specific case of a 5×5 aperture function (an odd number in row and column) does not occur at all because the extra lines of output processing are omitted.

Odd sizes of a kernel, in both directions, are symmetrical around a center, but with even sizes the center is offset. The IC in embodiments of the invention places the center for even sizes to the right of and below the natural division at position ($\lfloor M/2 \rfloor$, $\lfloor N/2 \rfloor$). In an alternative embodiment of the invention the circuit may be modified to position the center above and left of the natural division.

Other than these comments, the operation of the specific IC of FIG. 16 is as described for the other versions described.

Figure 10A:
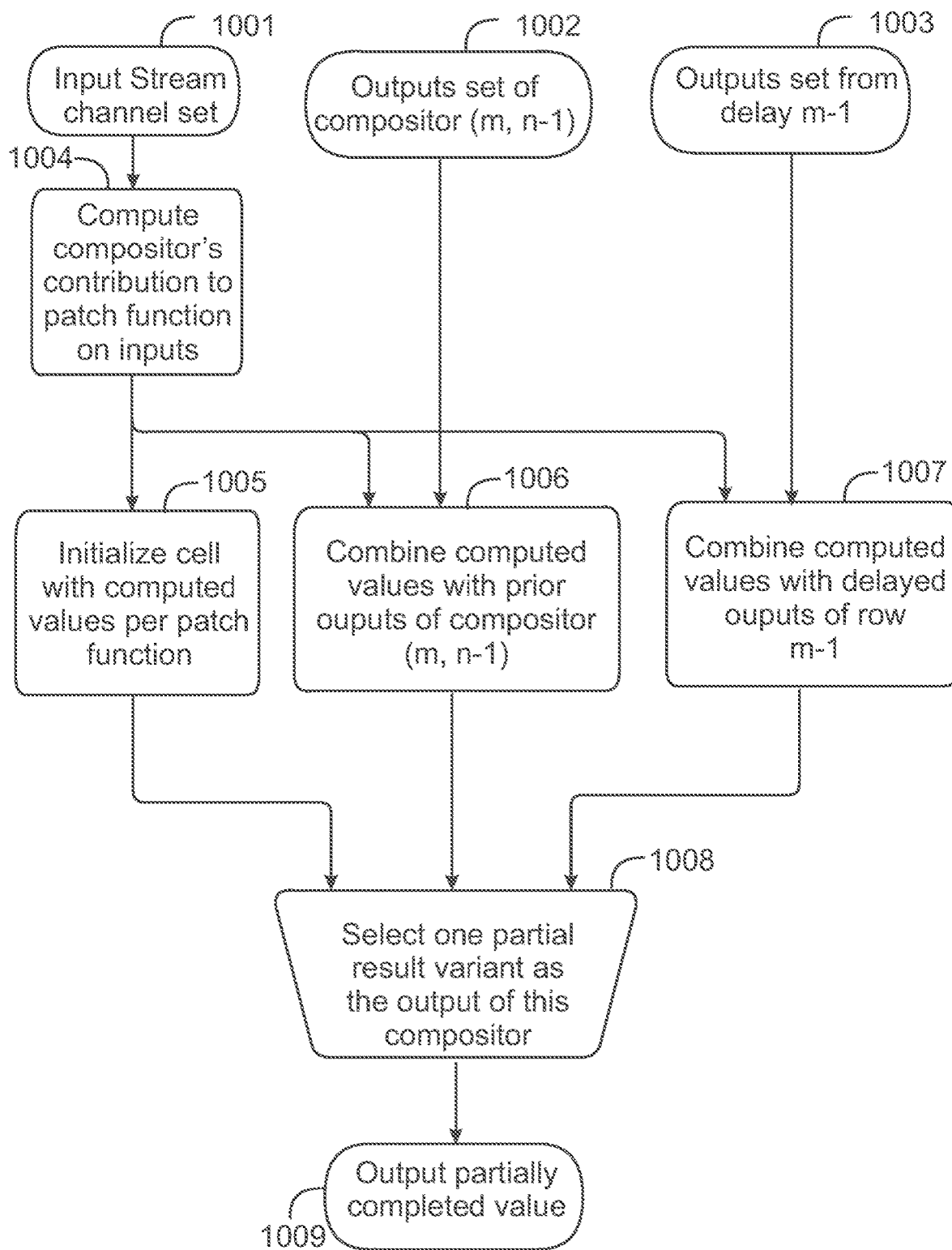
FIG. 10A is a diagram illustrating internal structure of compositors 905a, 905b, and 905c of FIGS. 9A and 9B in an embodiment of the invention.

FIG. 10A is a diagram illustrating internal structure and operation of compositors 905a, 905b and 905c of FIGS. 9A and 9B, or FIG. 15 in an embodiment of the invention. The source input set of stream values in channel set 1001, which may be singular, or a mix of data types as required by the aperture function, is used to compute the contribution of each individual compositor by circuitry 1004.

Circuitry 1005 computes the initial value of the sub-function utilizing the output of 1004. Circuitry 1006 computes the ongoing partial value of the sub-function utilizing the output of 1004 and the partial value previously computed by the compositor immediately to the left 1002. Circuitry 1007 computes the ongoing partial value of the sub-function utilizing the output of 1004 and the partial value previously computed and delayed from one of 908*a*, 908*b*, 908*c*, 908*d*, 908*e*, and 908*f* on the compositor row immediately above 1003.

Operation of circuitry 1005, 1006, and 1007 may be contemporaneous (in the same clock cycle) with the operation of circuitry 1004 using the shared output thereof or may be implemented by a series of pipeline stages synchronized by the same clock.

A multiplexor 1008 selects which variant of partial result is forwarded as the partial value of the sub-function as the output of compositor 1009. If COLFST 811 is not asserted then the output of 1006 is selected, otherwise if ROWFST 808 is not asserted then the output of 1007 is selected, otherwise the output of 1005 is selected.

This conditional processing is a natural consequence of allowing the M by N aperture function to extend over the edges of the source input stream representing the R by C array of value sets. A single position on the leftmost edge or uppermost edge will be the first computable element of the aperture function for the several patches that abut or overlap those edges. As such, it is required that each and every compositor that is in the first computable position of an overlapping patch be initialized with the base value of the aperture function. Furthermore, each and every compositor that is in the first computable position of a subsequent row of the patch must be combined with the prior value of the partial value of the same patch computed from the immediately previous row. In this fashion, the correct computation of all patches that overlap, abut, or are interior to the uppermost and left most edges is ensured using a single circuit.

In FIGS. 10B through 10G, all elements introduced in FIG. 10A and using the same element number are functionally identical to those described with reference to FIG. 10A.

Figure 10B:
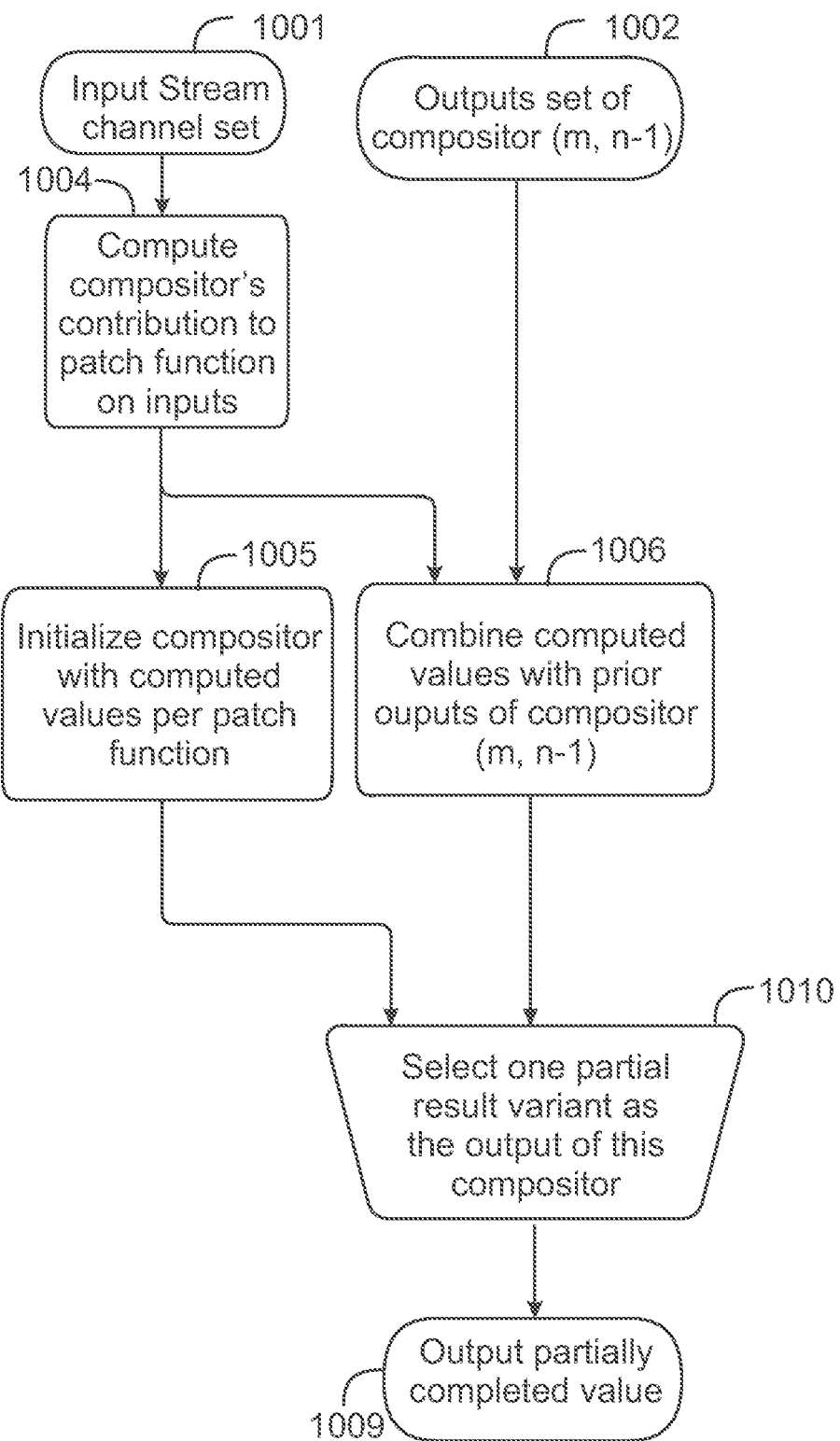
FIG. 10B is a diagram illustrating internal structure of compositors 902a, 902b and 902c of FIGS. 9A and 9B in an embodiment of the invention.

FIG. 10B is a diagram illustrating internal structure and operation of compositors 902*a*, 902*b* and 902*c* of FIGS. 9A and 9B, or FIG. 15 in an embodiment of the invention. The source input set of stream values 1001 is used to by circuitry 1004 to compute the compositor's contribution to the aperture function.

Circuitry 1005 computes the initial value of the sub-function utilizing the output of 1004 and circuitry 1006 computes the ongoing partial value of the sub-function utilizing the output of 1004 and the partial value previously computed by the compositor immediately to the left 1002.

Multiplexor 1010 selects which variant of partial result is forwarded as the partial value of the sub-function as the output of the compositor 1009. If COLFST 811 is not asserted then the output of 1006 is selected, otherwise the output of 1005 is selected.

Figure 10C:
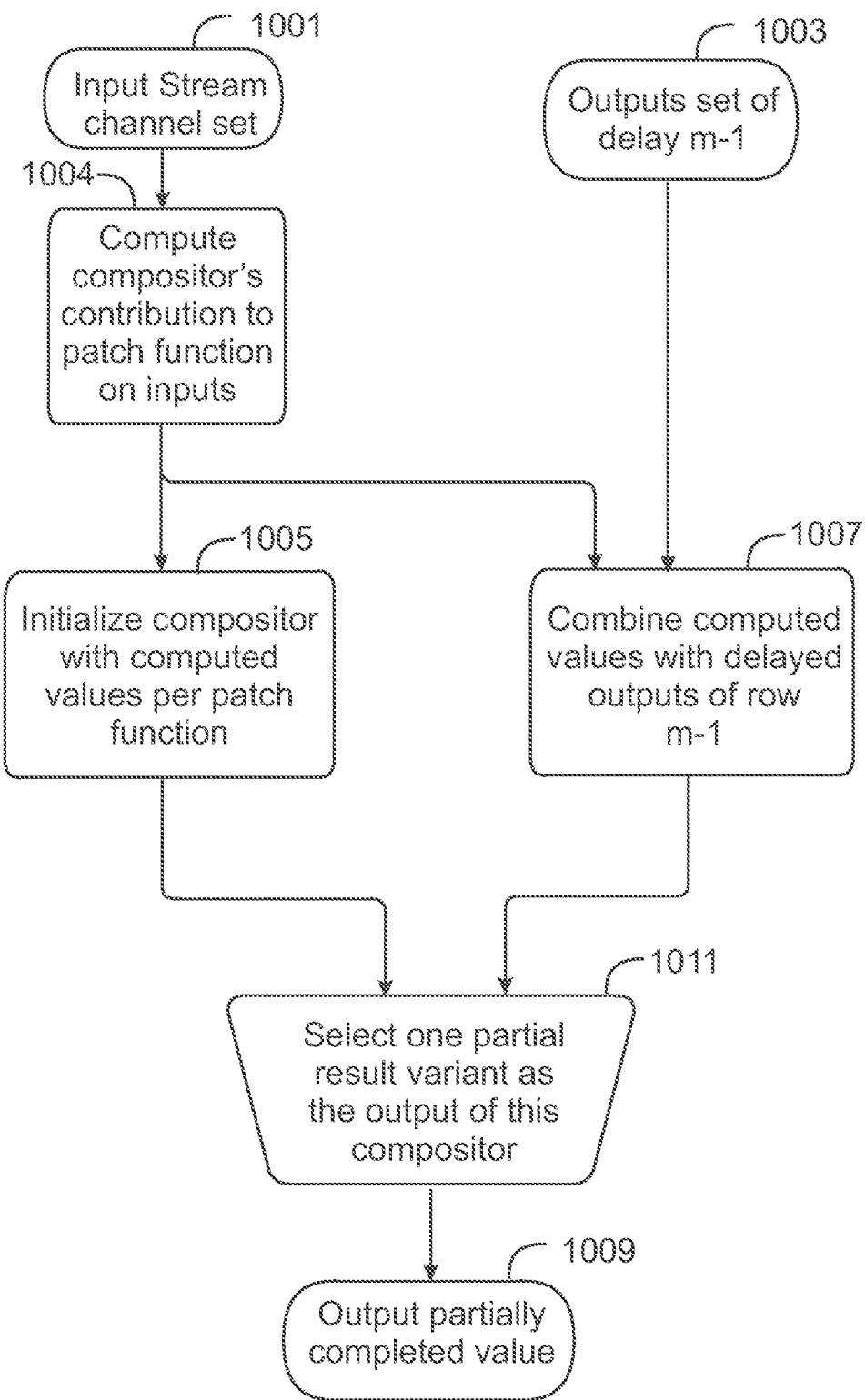
FIG. 10C is a diagram illustrating internal structure of compositor 904 of FIG. 9A in an embodiment of the invention.

FIG. 10C is a diagram illustrating internal structure and operation of compositors 904 of FIG. 9A or FIG. 15 in an embodiment of the invention. The source input set of stream values 1001 is used by circuitry 1004 to compute the contribution of each individual compositor.

Circuitry 1005 computes the initial value of the sub-function utilizing the output of 1004 and circuitry 1007 computes the ongoing partial value of the sub-function utilizing the output of 1004 and the partial value previously computed and delayed from one of 908*a*, 908*b*, 908*c*, 908*d*, 908*e*, and 908*f* on the compositor row immediately above 1003.

Multiplexor 1011 selects which variant of partial result is forwarded as the partial value of the sub-function as the output of the compositor 1009. If ROWFST 808 is not asserted then the output of 1007 is selected, otherwise the output of 1005 is selected.

Figure 10D:
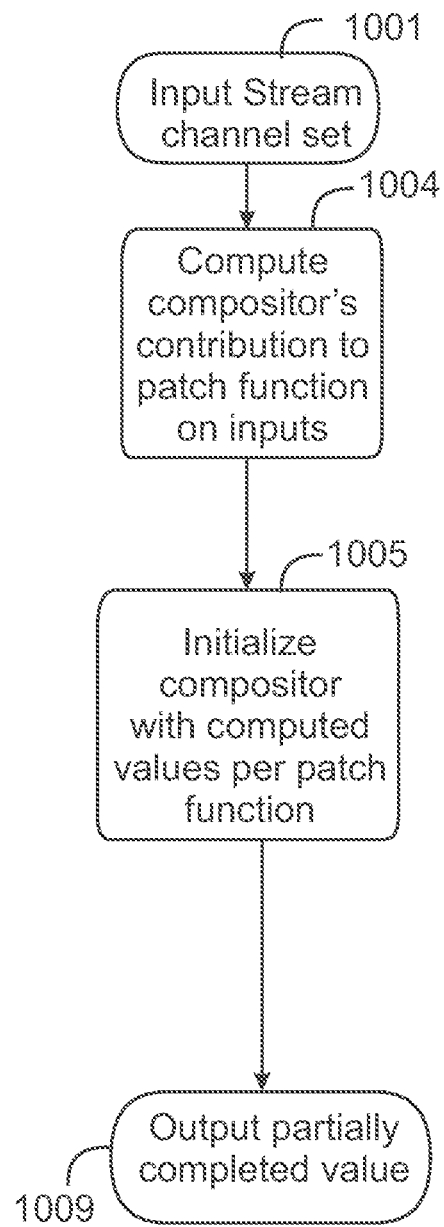
FIG. 10D is a diagram illustrating internal structure of compositor 901 of FIG. 9A in an embodiment of the invention.

FIG. 10D is a diagram illustrating internal structure and operation of compositor 901 of FIG. 9A or FIG. 15 in an embodiment of the invention. The source input set of stream values 1001 is used by circuitry 1004 to compute the contribution of each individual compositor.

Circuitry 1005 computes the initial value of the sub-function utilizing the output of 1004 which is forwarded as the partial value of the sub-function as the output of the compositor 1009.

Cell 901 (FIG. 9A, FIG. 15) is always the first value in any full or truncated patch where utilized and thus always produces an initialization value for the patch.

Figure 10E:
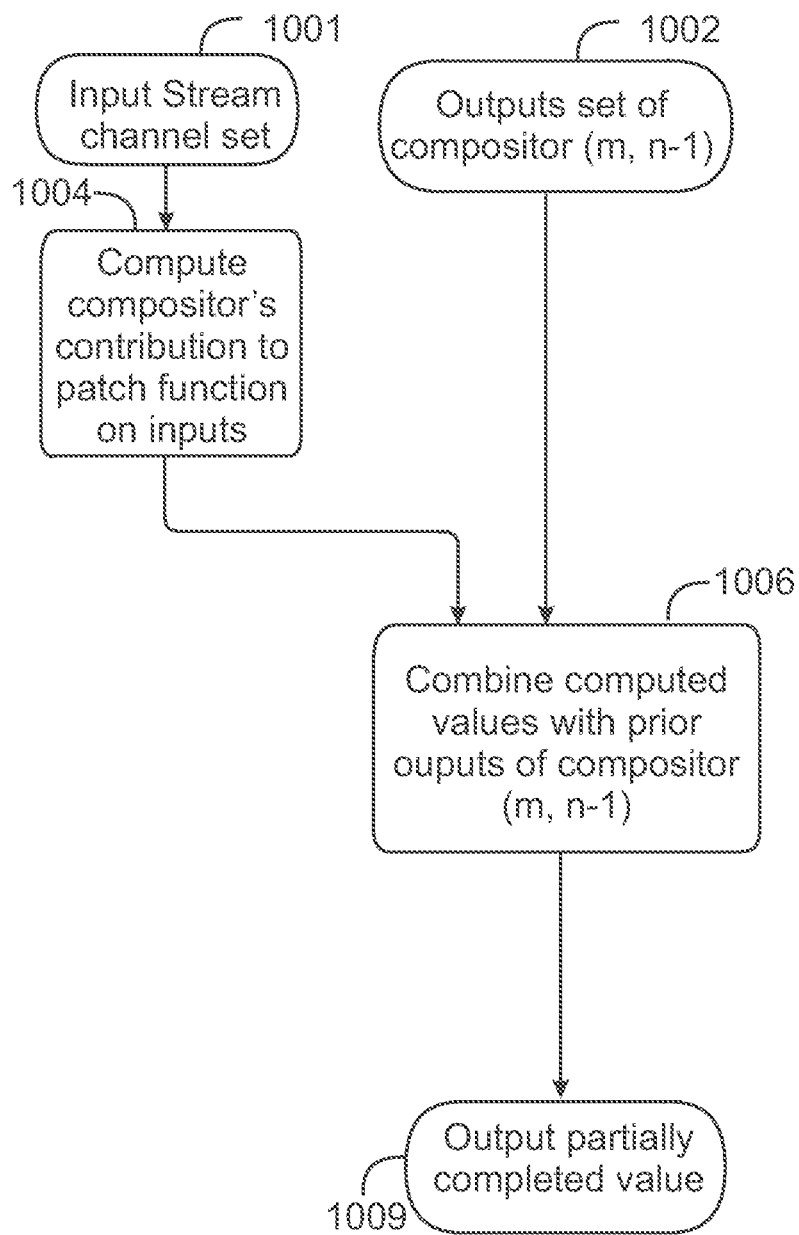
FIG. 10E is a diagram illustrating internal structure of compositors 903a, 903b and 903c of FIGS. 9B and 9C in an embodiment of the invention.

FIG. 10E is a diagram illustrating internal structure and operation of compositors 903*a*, 903*b* and 903*c* of FIGS. 9B and 9C or FIG. 15 in an embodiment of the invention. The source input set of stream values 1001 is used by circuitry 1004 to compute the contribution of each individual compositor.

Circuitry 1006 computes the ongoing partial value of the sub-function utilizing the output of circuitry 1004 and the partial value previously computed by the compositor immediately to the left 1002 which is forwarded as the partial value of the sub-function as the output of the compositor 1009.

Figure 10F:
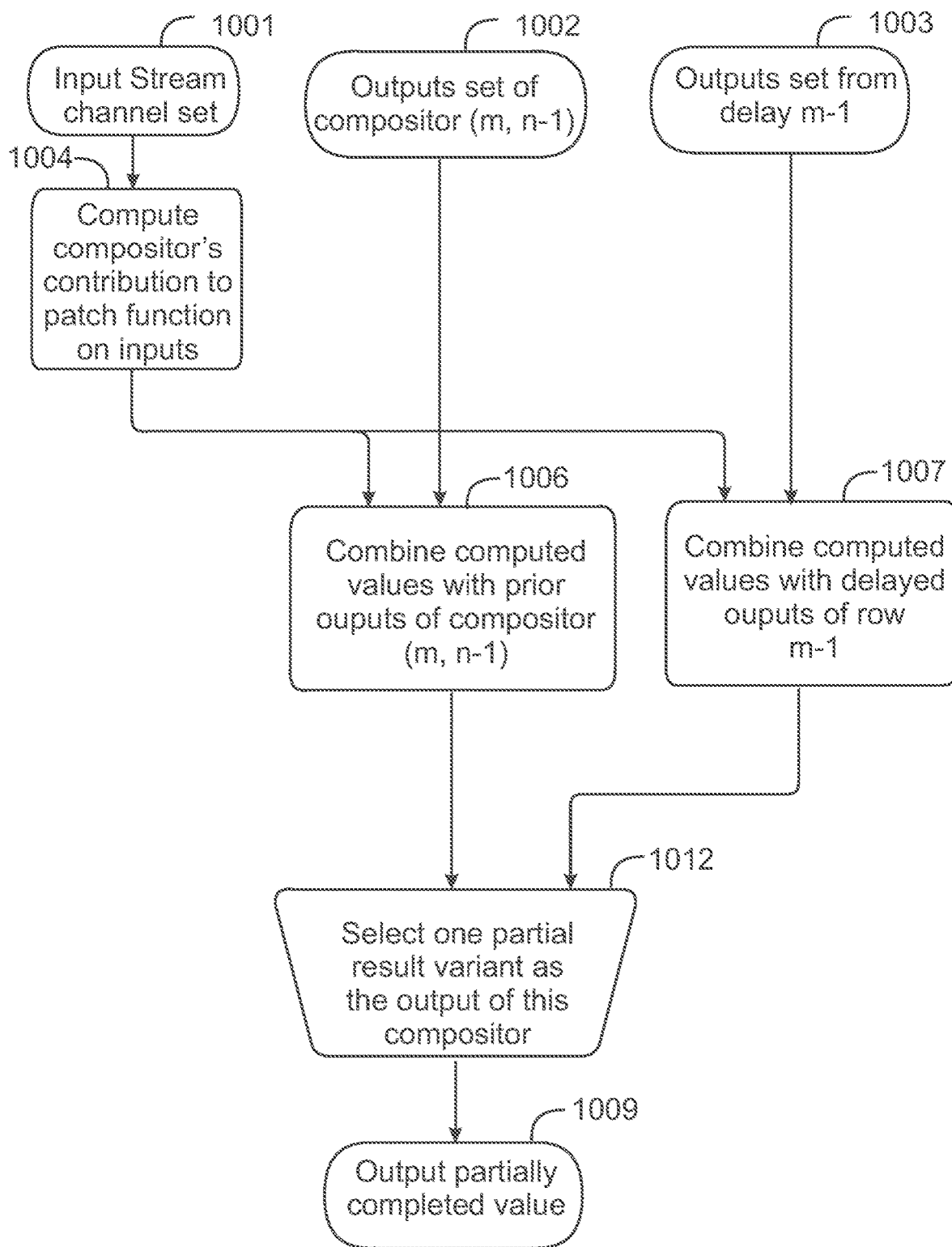
FIG. 10F is a diagram illustrating internal structure of compositors 907a, 907b and 907c of FIGS. 9A and 9B in an embodiment of the invention.

FIG. 10F is a diagram illustrating internal structure and operation of compositors 907*a*, 907*b* and 907*c* of FIGS. 9A and 9B or FIG. 15 in an embodiment of the invention. The source input set of stream values 1001 is used to compute the contribution of each individual compositor 1004.

Circuitry 1006 computes the ongoing partial value of the sub-function utilizing the output of circuitry 1004 and the partial value previously computed by the compositor immediately to the left 1002. Circuitry 1007 computes the ongoing partial value of the sub-function utilizing the output of 1004 and the partial value previously computed and delayed from one of 908*a*, 908*b*, 908*c*, 908*d*, 908*e*, and 908*f* on the compositor row immediately above 1003.

Multiplexor 1012 selects which variant of partial result is forwarded as the partial value of the sub-function as the output of the compositor 1009. If COLFST 811 is not asserted then the output of 1006 is selected, otherwise the output of 1007 is selected.

Figure 10G:
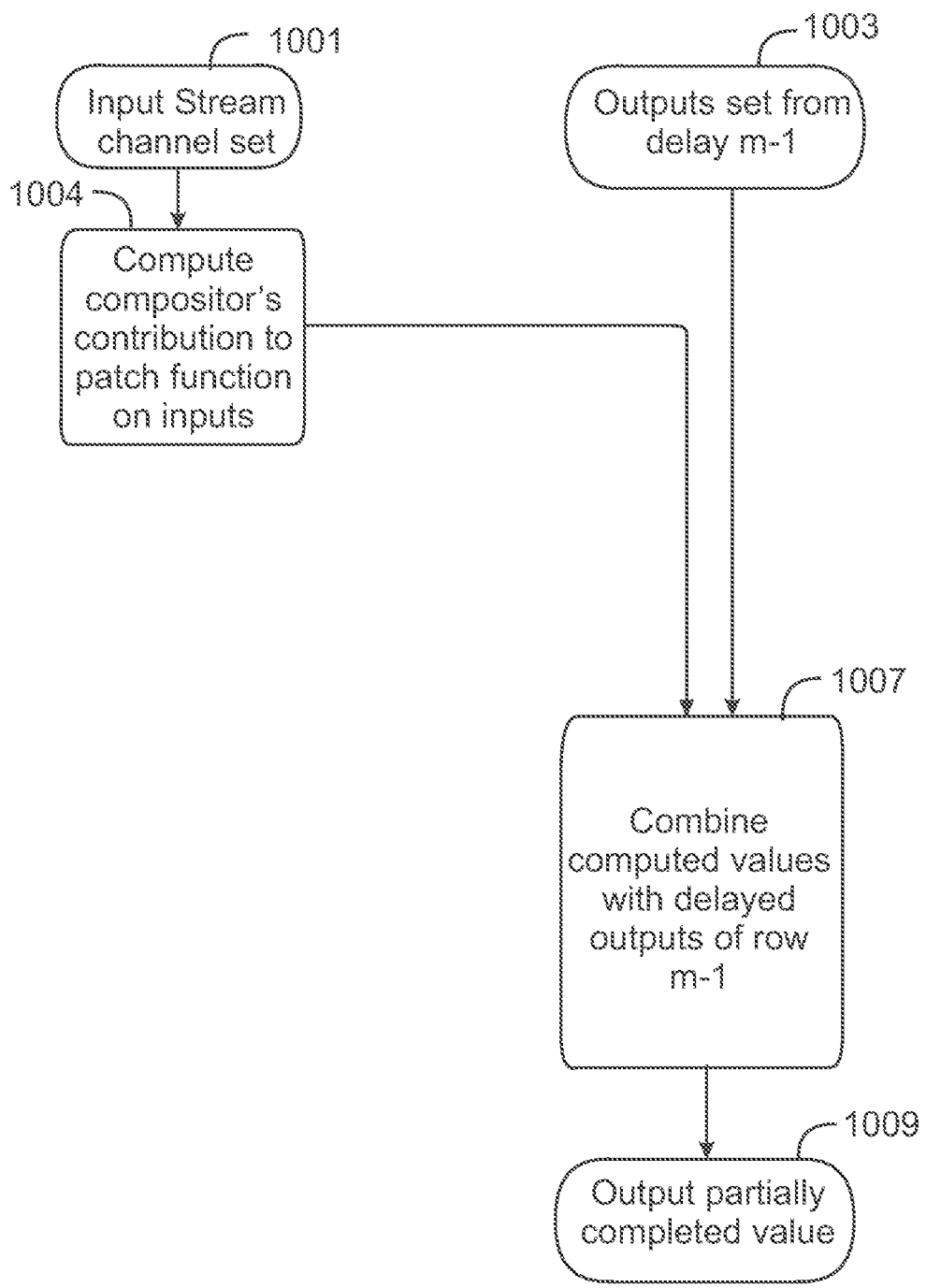
FIG. 10G is a diagram illustrating internal structure of compositor 906 of FIG. 9A in an embodiment of the invention.

FIG. 10G is a diagram illustrating internal structure and operation of compositors 906 of FIG. 9A or FIG. 15 in an embodiment of the invention. The source input set of stream values 1001 is used by circuitry 1004 to compute the contribution of each individual compositor.

Circuitry 1007 computes the ongoing partial value of the sub-function utilizing the output of circuitry 1004 and the partial value previously computed and delayed from one of 908*a*, 908*b*, 908*c*, 908*d*, 908*e*, and 908*f* on the compositor row immediately above at 1003. The output of circuitry 1007 is forwarded as the partial value of the sub-function as the output of the compositor 1009.

Figure 11:
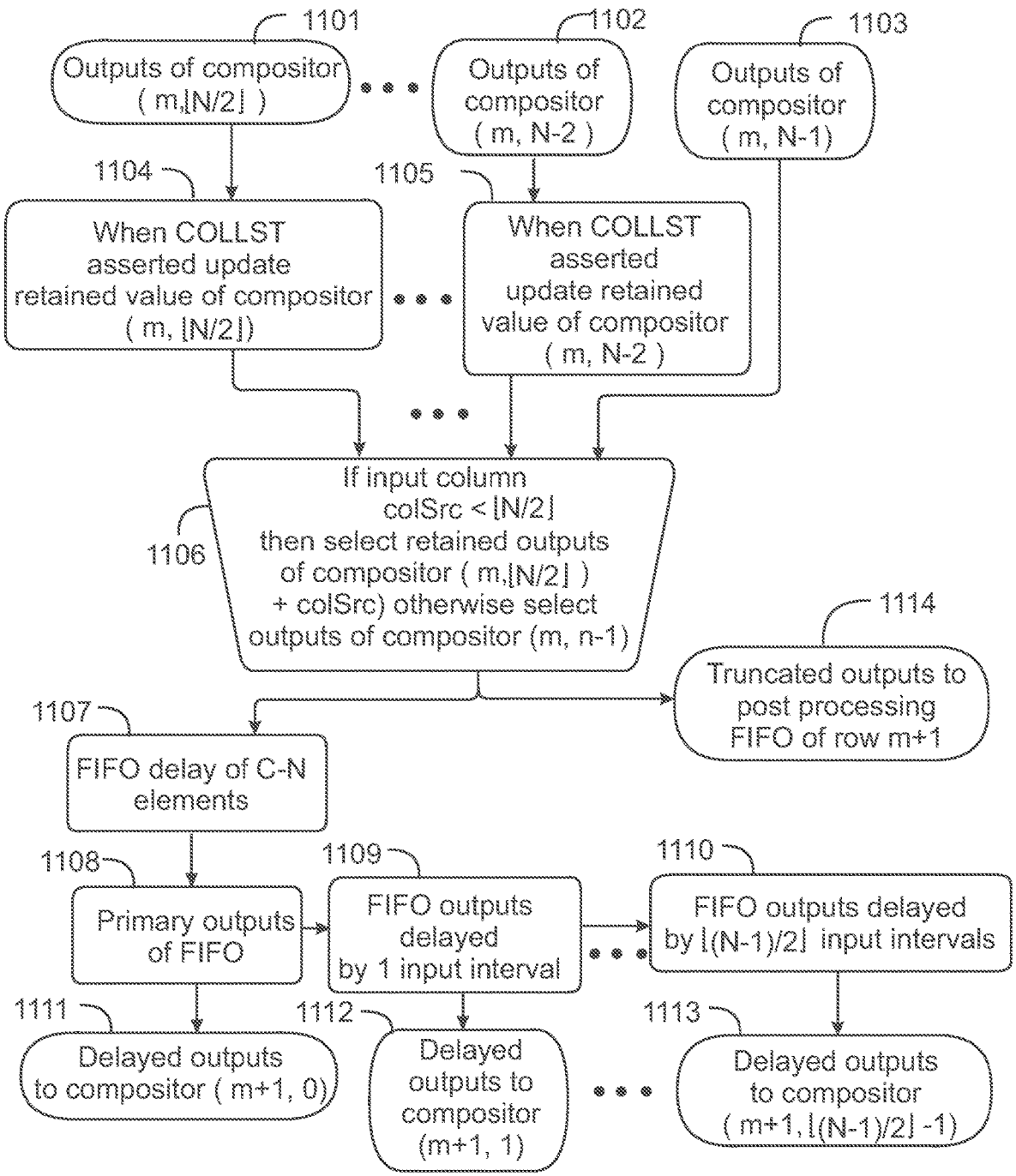
FIG. 11 is a diagram describing internal structure and function of delay stages 908a, 908b, 908c, 908d, 908e and 908f of FIG. 9C in an embodiment of the invention.

FIG. 11 is a diagram illustrating internal structure and operation of intra row delay lines 908*a*, 908*b*, 908*c*, 908*d*, 908*e*, and 908*f* (FIG. 9C). The delay lines are used to retain partially computed results from each row of compositors to be used in the next row.

When COLLST is asserted the current position of the source input stream is at the rightmost edge and the outputs of compositors of the rows ⌊N/2⌋ (1101) through N−2 (1102) are retained for future reference by registers 1104 through 1105 respectively.

If the current position of the source input stream, colSrc, is less than ⌊N/2⌋, multiplexor 1106 selects from the retained values in reverse order from right to left as defined by the index calculation (N−2)-colSrc, otherwise it selects the current value from the last compositor of row m (1103).

Note that when the source input stream column position is less than ⌊N/2⌋, the rightmost compositor of the row will not contain valid data which makes these time slots available for inserting the retained data.

The partial outputs selected by multiplexor 1106 are fed into a first-in first out (FIFO) circuit 1107 with C—N positions, which is configured such that source input stream position is processed such that exactly one value is inserted, and one value is extracted in the same order as inserted. Since the partially completed results from one position will not be required until the source input stream returns to the same patch position on the next row, this effects a delay such that the partial results computed by one row will be presented to the next row precisely when needed.

The partial outputs selected by multiplexor 1106 also feed the same values (1114) into final results delay lines 909, 910*a* and 910*b*.

The partial outputs extracted from FIFO 1107 are routed by at 1108 both to the leftmost compositor on the next row (1111) and to a series of parallel access registers 1109 through 1110 which further delay the partial outputs by one source input stream interval as data is passed through the register chain.

When the current position of the source input stream is at the leftmost edge, the FIFO directs output data at 1108 and delayed results 1109 through 1110 are made available to the cells of the next row at 1111, 1112 through 1113 respectively.

It is noted that the extra values from the right side of the source input array stream inserted by multiplexor 1106 into FIFO 1107 are only accessed via path 1111 when the source input array stream position is near the right edge while the additional parallel paths 1112 through 1113 are only used when the source input array stream is at the leftmost position to access data that was inserted normally from path 1103. The apparent similarities in structure and requirements between right edge processing and left edge processing is a natural consequence of the symmetry of the overlap of the sub-function with the right and left edges of the source input stream array. When the value for N is an even number, the number of extra cells processed to support right and left edges is not the same.

Figure 12:
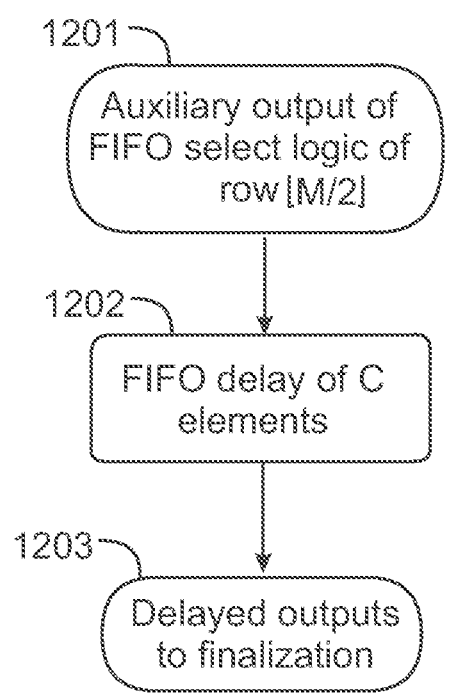
FIG. 12 is a diagram illustrating operation of delay stage 909 of FIG. 9C in an embodiment of the invention.

FIG. 12 is a diagram illustrating internal structure and operation of the final truncated results delay line 909 (FIG. 9C).

When processing the last row of the source input stream array, the partial results from auxiliary output 1201 of intra row delay line 908*d* are considered to be the final results of the final row of truncated patches and are retained in a FIFO 1202 whose number of elements C is equal to the width of the source input stream array.

Immediately after recording the final results of the truncated patches, the outputs of FIFO 1202 will be transferred via 1203 to further delay lines 910*a* or directly to final processing 911 if the value of M is such that no other delay lines intervene.

Figure 13:
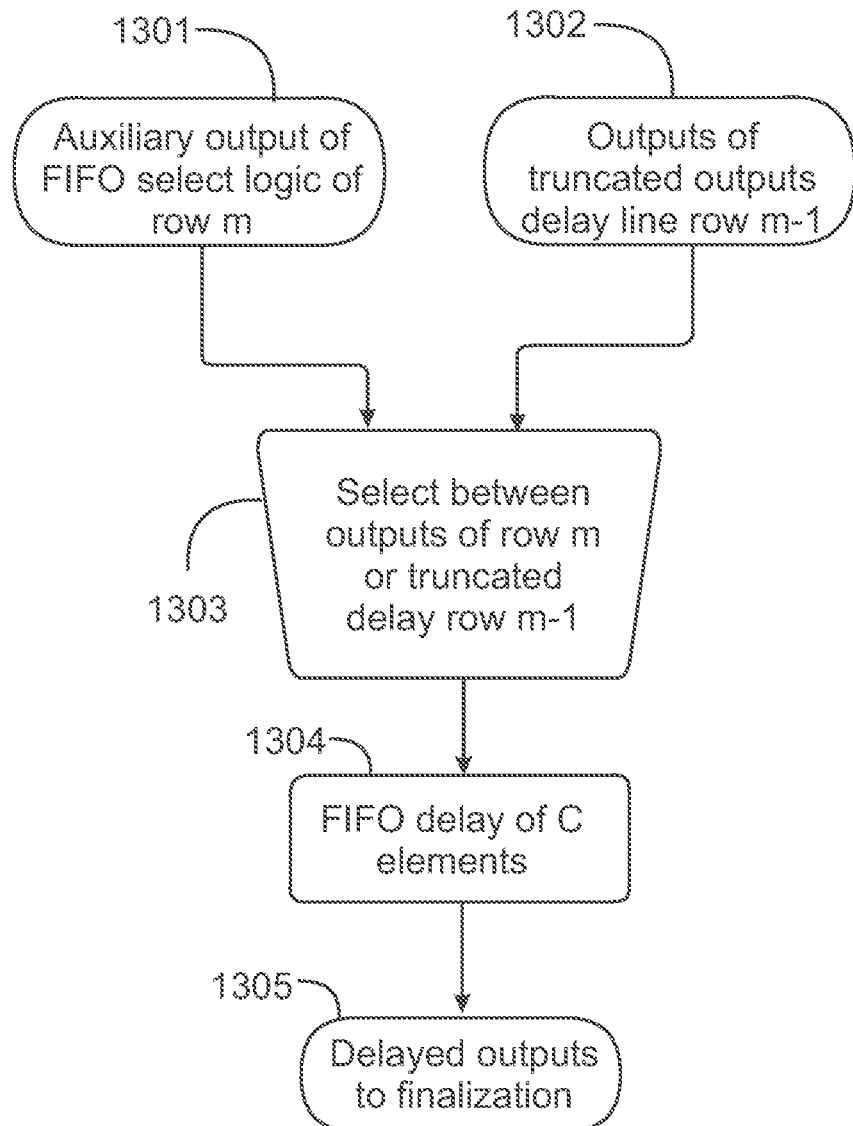
FIG. 13 is a diagram illustrating operation of delay stages 910a and 910b of FIG. 9C in an embodiment of the invention.

FIG. 13 is a diagram illustrating internal structure and operation of the final truncated results delay lines 910*a* and 910*b*.

When processing the last row of the source input stream array, the partial results 1301 from the auxiliary output of intra row delay lines 908*e* through 908*f* are considered to be the final results of the final row of truncated patches and are retained in a FIFO 1304 whose number of elements C is equal to the width of the source input stream array.

When POSTEN is asserted multiplexor 1303 switches between taking values from 1302 to taking values from the final truncated delay line of the row above which will have the effect of presenting the final truncated results in row first order compatible with the ordering of all prior output results.

Note that during that cycle of an input frame when POSTEN is first asserted, the contents of FIFOs 1202 and 1304 are the final values of the truncated patches that overlap the last row of the source input stream array. Any data contained in FIFOs 1202 and 1304 prior to that cycle will not be processed, so any suppression of the execution when not processing the final row of the source input stream array is optional.

Immediately after recording the final results of the truncated patches, the outputs of FIFO 1304 are transferred via 1305 to further delay lines or directly to final processing 911 if the value of M is such that no other delay lines intervene.

Figure 14:
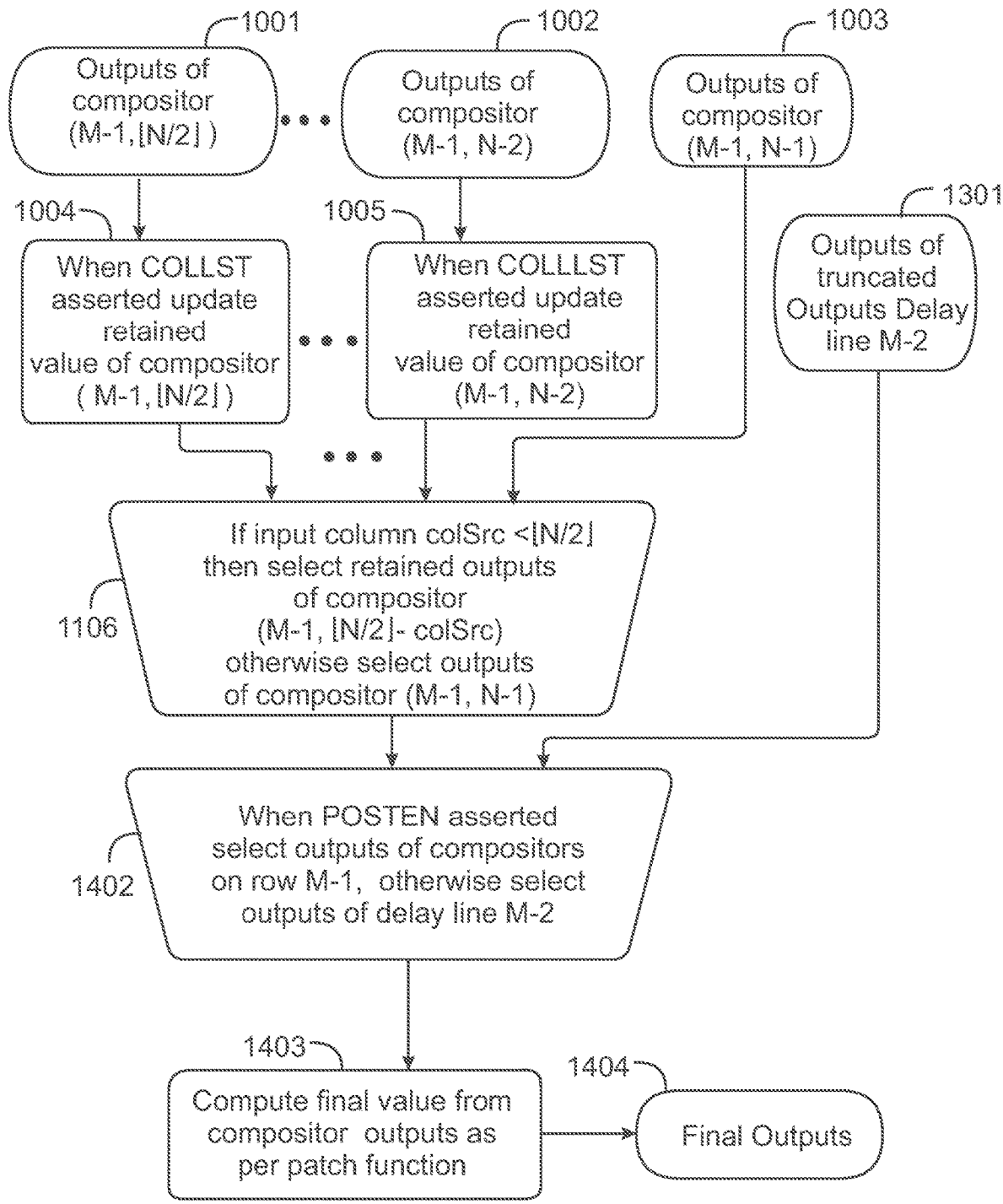
FIG. 14 is a diagram illustrating operation of finalization step 911 in FIG. 9C.

FIG. 14 is a diagram illustrating internal structure and operation of the final processing of all full and truncated results.

As in FIG. 11 and with identical construction and function, if the current position of the source input stream is at the rightmost edge, the outputs of cells of rows M−1 from ⌊N/2⌋ (1101) through N−2 (1102) are retained for future reference by registers 1104 through 1105 respectively.

If the current position of the source input stream is less than ⌊N/2⌋, multiplexor 1106 selects from the retained values in reverse order from right to left, otherwise it selects the current value from the last compositor of row M−1 (1103).

While processing the source input stream array, multiplexor 1402 feeds the results selected by multiplexor 1106 directly to finalization (1403). When in the post processing phase outputs of truncated result delay lines 1401 are selected instead for finalization (1403).

Finalization circuitry 1403 performs all additional computations, if any, to produce the final form of the output stream (1404) from composed patch results. This may typically take the form of a Rectified Linear Activation (RELU) function, whereby negative values are set to zero and over limit values are set to maximum acceptable value, or any other desired conditioning function such as sigmoid or tanh. The post processing function is not required to complete within a single source input stream cycle but is required to accept each final result at the rate of the source input stream array.

When DSTEN is asserted, finalization circuitry 1403 presents the final results as one value of the destination output stream. At any time that DSTEN is not asserted, any partial or incorrect values produced by finalization circuitry 1403 are ignored, so any suppression of operation when results are not used is optional.

In one implementation, the destination output stream array is processed by circuitry similar to the foregoing. In that case, it is advantageous that the timing of the final truncated results be identical to all previous final results. To that end, control of FIFOs 1202 and 1304 is coordinated by control circuitry 702 to maintain an output rate identical to the primary output rate.

In another implementation, the destination output stream array is the final stage of the system, and no further processing is required. In that case, it is advantageous that the timing of the final truncated results be completed as quickly as possible. To that end control of FIFOs 1202 and 1304 is coordinated by control circuitry 702 to output those results at the maximum frequency supported.

Note that the implementation described above produces a single output element from the full set of input elements. In a complete system that produces a large set of output elements from the input set, the entire mechanism described is duplicated once for every output channel with the notable exception of control circuitry 702 which may be shared by output channels, since the timing of all individual sub-functions is identical for the entire output set.

The inventor has built a working prototype of an IC in an embodiment of the invention to test and confirm the details and features of the invention, and operation of the prototype confirms the descriptions above. The inventor has also developed a software supported simulator, which has been used up to the time of filing this application to test and confirm the details and descriptions above.

In another aspect of the present invention, a system is provided to accept an input stream of three-dimensional data, as is commonly presented in medical imaging, wherein additional circuitry and buffering is included to allow a three-dimensional aperture function to pass over the three-dimensional input array with corresponding computations that correctly implement both interior and edge cases for the first and last planes.

In yet another aspect of the present invention, for the complex process of training a Deep Neural Network (DNN), a hardware-assisted Neural Network training system is provided wherein the bulk of the effort is done by a forward inference engine and the training algorithm need only use the statistics gleaned from forward inference to periodically adjust weights and biases for the full network to converge the model to a desired state. With the addition of appropriate accumulators summing the input states as the forward inference process is computed, the instant invention forms the hardware assisted Neural Network training system.

In yet another aspect of the invention, regarding a well-known problem wherein limitations of floating-point accuracy impede convergence of DNN models (known in the art as the "vanishing gradient problem"), a single mass multiplier is provided with limited bit width precision, that may be cascaded with additional adders to produce floating point products of arbitrarily large precision. While this innovation is not generally required for forward inference computations, it may be critically important in a DNN trainer to avoid problems that arise when the gradients computed become too small to measure.

The skilled person will understand that the embodiments illustrated in the figures and described above are all exemplary, and do not detail every form that the invention might take. There may be a variety of other forms that may be realized within the scope of the invention.

The invention is limited only by the scope of the claims.

The invention claimed is:

1. An integrated circuit (IC) implementing an M by N aperture function over an R by C source array to produce an R by C destination array, the IC comprising:

an input port receiving an ordered stream of independent input values from the source array;

an output port producing an ordered output stream of output values into the destination array;

a mass multiplier circuit coupled to the input port, multiplying in parallel each input value in order by every weight required by the aperture function, producing streams of products on a set of parallel conductive product pathways on the IC, each product pathway dedicated to a single product of an input by a weight value;

an M by N array of compositor circuits on the IC, each compositor circuit associated with a sub-function of the aperture function at the (m, n) position, and coupled by a dedicated pathway to each of the set of product pathways carrying a product produced from a weight value associated with the sub-function;

single dedicated pathways between compositors;

delay circuits on the IC receiving values on dedicated pathways from compositors and providing the values delayed at later times on dedicated pathways to other compositors downstream;

a finalization circuit; and a control circuit operating counters and producing control signals coupled to the compositors, the delay circuits, and the finalization circuit;

characterized in that in each source interval the compositors combine the values received from the dedicated connections to the parallel conductive pathways, further combine that result to an initial value for that compositor or to a value on the dedicated pathway from an adjacent compositor upstream, or to a value received from a delay circuit, and post that combined result to a register coupled to the dedicated pathway to the adjacent compositor downstream, or to a delay circuit, or both, and, upon a last downstream compositor producing a complete composition of values for an output of the aperture function at a specific position of the R by C array of inputs, that composed value is passed to the finalization circuit, which processes the value and posts the result to the output port as one value of the output stream.

2. The apparatus of claim 1, wherein the aperture function is for a Convolutional Neural Node, wherein in each source interval the compositors add the products of the weights with inputs, and add that sum of the products to an initial bias or to a value on the dedicated pathway from an adjacent compositor upstream, or to a value received from a delay circuit, and post that summation to an output register.

3. The apparatus of claim 1, wherein the aperture function produces truncated results for positions of the aperture that overlap the M by N input patches with the left and right edges of the R by C input array, wherein for specific source intervals wherein the source input position represents the first or last columns of the R by C input array, results of truncated patches are delayed, accessed by the compositors and integrated with the flow of complete interior patches.

4. The apparatus of claim 1, wherein the aperture function produces truncated results for those specific positions that overlap the M by N input patches with the topmost edge of the R by C input array, wherein for specific source intervals where the source input position represents the first row of the R by C input array, results of truncated patches are delayed, accessed by the compositors and integrated with the flow of complete interior patches.

5. The apparatus of claim 1, wherein the aperture function produces truncated results for those specific positions that overlap the M by N input patches with the bottom edge of the R by C input array, wherein for specific source intervals where the source input position represents the first row of the R by C input array, results of truncated patches are delayed and integrated with the flow of complete interior patches.

6. The apparatus of claim 1, wherein specific outputs of the aperture function are omitted from the output stream in a fixed or variable stepping pattern.

7. A method implementing an M by N aperture function over an R by C source array, producing an R by C destination array, comprising:
providing an ordered stream of independent input values from the source array to an input port of an integrated circuit (IC);
multiplying in parallel each input value in order by every weight value required by the aperture function by a mass multiplier circuit on the IC coupled to the input port;
producing by the mass multiplier streams of products on a set of parallel conductive product pathways on the IC, each product pathway dedicated to a single product of an input by a weight value;
providing to each of an M by N array of compositor circuits on the IC, each compositor circuit associated with a sub-function of the aperture function, by dedicated connections to each compositor circuit from the streams of products, those products produced from a weight value associated with the sub-function;
providing control signals to the compositors, to a plurality of delay circuits and to a finalization circuit by a control circuit executing counters and producing control signals;
combining by the compositors, in each source cycle, the values received from the dedicated connections to the streams of products, with an initial value for that compositor or to a value on a dedicated pathway to an adjacent compositor upstream, or to a value received from one of a plurality of delay circuits, and posting the result in a register coupled to a dedicated pathway to an adjacent compositor downstream, or to one of the plurality of delay circuits;
upon a last downstream compositor producing a complete combination of values for an output of the aperture function at a specific position on the R by C array of inputs, providing that complete combination to a finalization circuit;
processing the complete combination by the finalization circuit and posting the result to an output port as one value in an ordered output stream; and
continuing operation of the IC until all input elements have been received and a last output value has been produced to the output stream.

8. The method of claim 7, wherein the aperture function is for a Convolutional Neural Node, wherein, in each source interval the compositors add the products of the weights with inputs and add that sum of the products to an initial bias or to a value on the dedicated pathway from an adjacent compositor upstream, or to a value received from a delay circuit, and post that summation to an output register.

9. The method of claim 7, wherein the aperture function produces truncated results for positions of the aperture that overlap the M by N input patches with the left and right edges of the R by C input array, wherein for specific source intervals wherein the source input position represents the first or last columns of the R by C input array, results of truncated patches are delayed, accessed by the compositors and integrated with the flow of complete interior patches.

10. The method of claim 7, wherein the aperture function produces truncated results for specific positions that overlap the M by N input patches with the topmost edge of the R by C input array, wherein for specific source intervals where the source input position represents the first row of the R by C input array, results of truncated patches are delayed, accessed by the compositors and integrated with the flow of complete interior patches.

11. The method of claim 7, wherein the aperture function produces truncated results for those specific positions that overlap the M by N input patches with the bottom edge of the R by C input array, wherein for specific source intervals where the source input position represents the first row of the R by C input array, results of truncated patches are delayed and integrated with the flow of complete interior patches.

12. The method of claim 7, wherein specific outputs of the aperture function are omitted from the output stream in a fixed or variable stepping pattern.

* * * * *